(12) United States Patent
Hirai

(10) Patent No.: US 10,832,064 B2
(45) Date of Patent: Nov. 10, 2020

(54) VACANT PARKING SPACE DETECTION APPARATUS AND VACANT PARKING SPACE DETECTION METHOD

(71) Applicant: PANASONIC INTELLECTUAL PROPERTY MANAGEMENT CO., LTD., Osaka (JP)

(72) Inventor: Yoshito Hirai, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/584,204

(22) Filed: Sep. 26, 2019

(65) Prior Publication Data

US 2020/0104613 A1 Apr. 2, 2020

(30) Foreign Application Priority Data

Sep. 28, 2018 (JP) .................. 2018-185751

(51) Int. Cl.
*G06K 9/00* (2006.01)
*G08G 1/14* (2006.01)
*G06K 9/32* (2006.01)

(52) U.S. Cl.
CPC ..... *G06K 9/00812* (2013.01); *G06K 9/00805* (2013.01); *G06K 9/3241* (2013.01); *G08G 1/143* (2013.01)

(58) Field of Classification Search
CPC .......... G06K 9/00805; G06K 9/00812; G06K 9/3241; G06K 9/4633; G06K 9/50; G08G 1/143
See application file for complete search history.

(56) References Cited

U.S. PATENT DOCUMENTS

| 2015/0054661 | A1* | 2/2015 | Noh ................ G08G 1/141 340/932.2 |
| 2015/0073660 | A1* | 3/2015 | Lee ................. B60R 1/00 701/41 |
| 2015/0161457 | A1* | 6/2015 | Hayakawa ........ G08G 1/166 348/46 |

(Continued)

FOREIGN PATENT DOCUMENTS

| JP | 5494845 | 5/2014 |
| JP | 5803807 | 11/2015 |

(Continued)

*Primary Examiner* — Sisay Yacob

(74) *Attorney, Agent, or Firm* — Greenblum & Bernstein, P.L.C.

(57) ABSTRACT

A vacant parking space detection apparatus according to the present disclosure includes a memory and a hardware processor coupled to the memory. The hardware processor is configured to: generate, for each of divided regions in a region around a vehicle, map information representing a presence probability of an object based on a detection result of a sensor for detecting an object present around the vehicle; define on the map information a plurality of first straight lines, whose intercepts differ from each other, with one or more angles to a straight advancing direction of the vehicle; and detect whether a vacant parking space is present at the angle based on a presence probability of an object assigned to the divided region belonging to each of the plurality of first straight lines.

13 Claims, 19 Drawing Sheets

(56) References Cited

U.S. PATENT DOCUMENTS

| | | | |
|---|---|---|---|
| 2015/0323785 A1* | 11/2015 | Fukata | H04N 5/2171 348/148 |
| 2017/0096167 A1* | 4/2017 | Yoon | B62D 15/0285 |
| 2017/0334353 A1 | 11/2017 | Gillot et al. | |
| 2018/0354504 A1 | 12/2018 | Kojo et al. | |

FOREIGN PATENT DOCUMENTS

| | | |
|---|---|---|
| JP | 2017-222309 | 12/2017 |
| JP | 2018-510801 | 4/2018 |
| WO | 2017/104163 | 6/2017 |

* cited by examiner

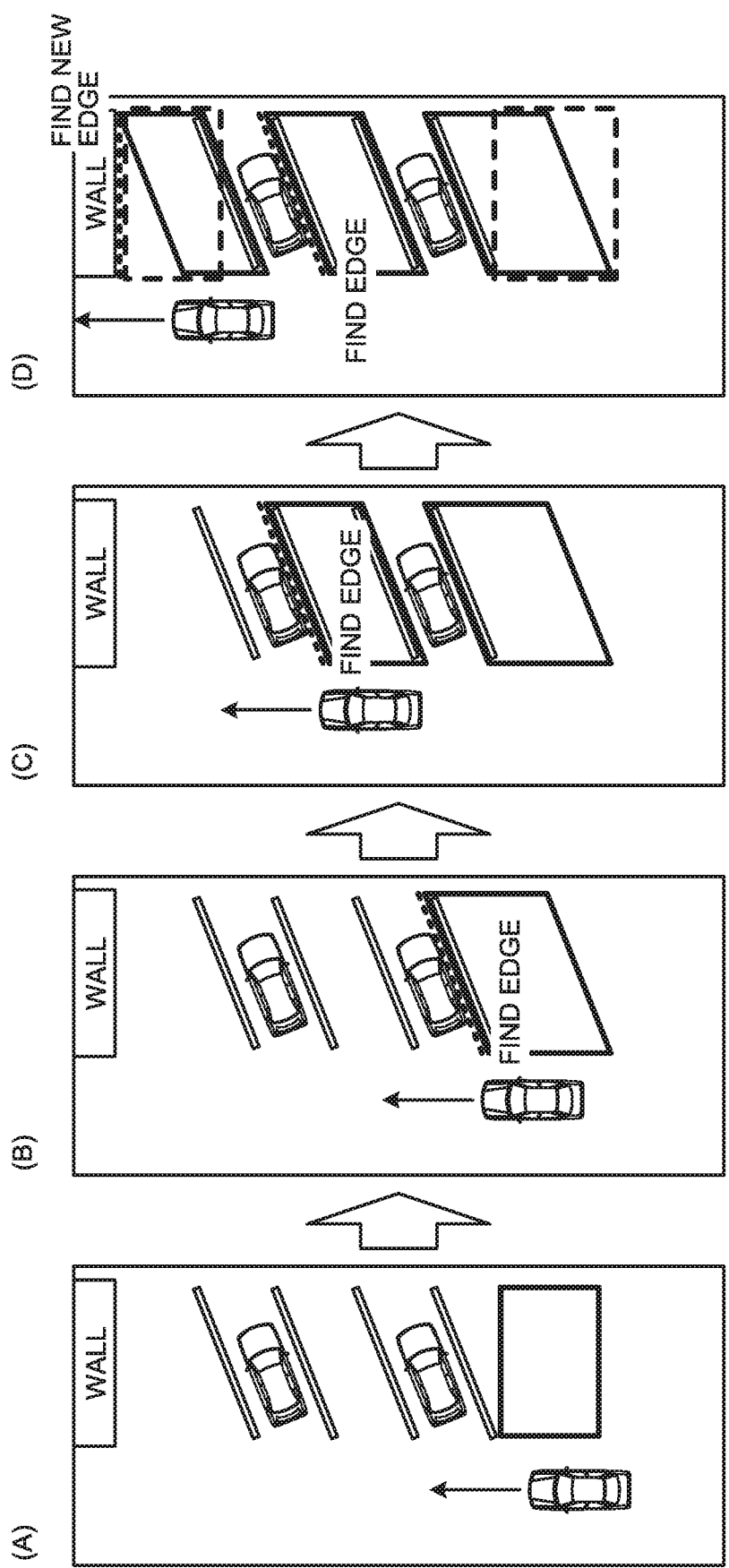

VACANT PARKING SPACE DETECTION APPARATUS AND VACANT PARKING SPACE DETECTION METHOD

CROSS-REFERENCE TO RELATED APPLICATIONS

This application is based upon and claims the benefit of priority from Japanese Patent Application No. 2018-185751, filed Sep. 28, 2018, the entire contents of which are incorporated herein by reference.

FIELD

The present disclosure relates to a vacant parking space detection apparatus and a vacant parking space detection method.

BACKGROUND

There are known various techniques for detecting a vacant parking space. For example, there is known a technique of determining, by a parking assist apparatus mounted on a vehicle, a vacant parking frame (vacant parking space) in a group of virtual parking frames by using the group of virtual parking frames that is set based on recognition information of parked vehicles and using an occupancy grid map in which a presence probability of an object is assigned to each of grid points obtained by dividing a region around the vehicle (for example, refer to Japanese Patent Application Laid-open No. 2017-222309).

However, in the foregoing known technique, the group of virtual parking frames and the occupancy grid map are separately set, and the determination of the vacant parking space is performed by combining the group of virtual parking frames and the occupancy grid map. Thus, a processing load for detecting the vacant parking space is likely to be large.

SUMMARY

A vacant parking space detection apparatus according to the present disclosure includes a memory and a hardware processor coupled to the memory. The hardware processor is configured to: generate, for each of divided regions in a region around a vehicle, map information representing a presence probability of an object based on a detection result of a sensor for detecting an object present around the vehicle; define on the map information a plurality of first straight lines, whose intercepts differ from each other, with one or more angles to a straight advancing direction of the vehicle; and detect whether a vacant parking space is present at the angle based on a presence probability of an object assigned to the divided region belonging to each of the plurality of first straight lines.

BRIEF DESCRIPTION OF THE DRAWINGS

FIG. 24 is a diagram for explaining a state in which a vehicle equipped with the parking assist apparatus according to the modification performs processing for detecting a vacant parking space while moving straight forward.

DETAILED DESCRIPTION

The following describes an example of a vacant parking space detection apparatus and a vacant parking space detection method according to embodiments of the present disclosure in detail with reference to the attached drawings.

First Embodiment

Figure 1:
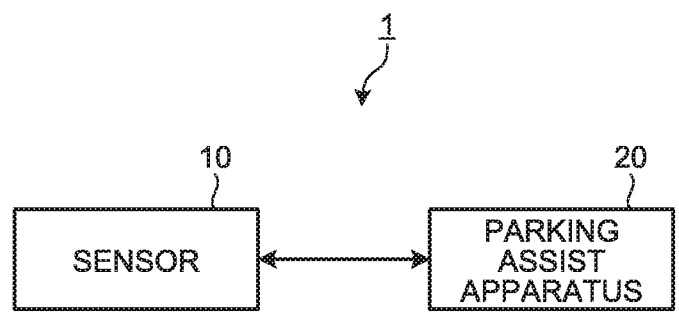
FIG. 1 is a diagram illustrating an example of a schematic configuration of a parking assist system according to a first embodiment.

FIG. 1 is a diagram illustrating an example of a schematic configuration of a parking assist system 1 according to the present embodiment. As illustrated in FIG. 1, the parking assist system 1 includes a sensor 10 and a parking assist apparatus 20. The sensor 10 and the parking assist apparatus 20 are electrically connected to each other via an in-vehicle network serving as an electric communication line. The in-vehicle network is configured as a controller area network (CAN), for example. The parking assist system 1 is mounted on a vehicle. Herein, the parking assist apparatus 20 corresponds to a "vacant parking space detection apparatus" for detecting a vacant parking space. The vehicle equipped with the vehicle system 1 may be, for example, an automatic driving vehicle that can automatically travel without a driving operation performed by a person for part of or the entire driving operation, or may be a normal vehicle that travels only with a driving operation performed by a person. The vehicle may be an automobile using an internal combustion engine (an engine) as a driving source, an electric vehicle using a motor as a driving source, or a hybrid automobile using both of the internal combustion engine and the motor as driving sources.

The sensor 10 is a sensor for detecting an object (obstacle) present around the vehicle. In this example, the sensor 10 is a distance sensor for measuring a distance to an object present around the vehicle. A configuration of the distance sensor is optional. The distance sensor may be a radar that emits radio waves and receives the radio waves reflected by the object, or may be a lidar that emits laser light and receives the laser light reflected by the object, or may be sonar that emits ultrasonic waves and receives the ultrasonic waves reflected by the object. The following describes an example of a case of using a radar as the sensor 10, but the embodiment is not limited thereto. For convenience of explanation, FIG. 1 illustrates only one sensor 10, but the number of sensors 10 and an attachment position of the sensor 10 in the vehicle can be optionally set. For example, the sensor 10 is disposed on a front surface, a side surface, a rear surface, and the like of a vehicle body so as to be able to detect an object present n a desired direction and a desired range around the vehicle.

The parking assist apparatus 20 is an apparatus for assisting parking of the vehicle equipped with the parking assist apparatus 20. The parking assist apparatus 20 is also called a parking assist electronic control unit (ECU). The parking assist apparatus 20 according to the present embodiment has a function of finding a vacant parking space during traveling of the vehicle to assist parking. The following mainly describes the function described above, but the function of the parking assist apparatus 20 is not limited thereto. In this case, as the vacant parking space, assumed is a vacant parking space for parallel parking or a vacant parking space for oblique parking.

Figure 2:
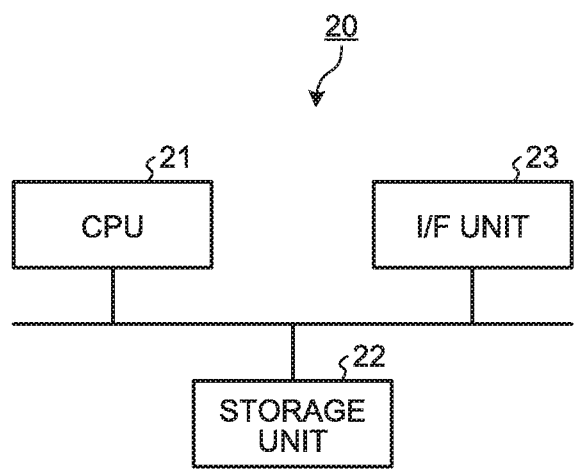
FIG. 2 is a diagram illustrating an example of a hardware configuration of a parking assist apparatus according to the first embodiment.

FIG. 2 is a diagram illustrating an example of a hardware configuration of the parking assist apparatus 20 according to the present embodiment. As illustrated in FIG. 2, the parking assist apparatus 20 at least includes a central processing unit (CPU) 21, a storage unit 22, and an interface (I/F) unit 23.

In the example of FIG. 2, exemplified are minimal hardware elements included in the parking assist apparatus 20, but the embodiment is not limited thereto. The parking assist apparatus 20 may further include other hardware elements. For example, the parking assist apparatus 20 may further include a display device that displays various pieces of information, or may further include an input device used for various inputs performed by a user.

The CPU 21 executes a computer program to integrally control an operation of the parking assist apparatus 20 and implements various functions of the parking assist apparatus 20. The various functions of the parking assist apparatus 20 will be described later.

The storage unit 22 includes a non-volatile memory (for example, a read only memory (ROM)) that stores various kinds of data such as a computer program executed by the CPU 21, and a volatile memory (for example, a random access memory (RAM)) including a working area for the CPU 21.

The I/F unit 23 is an interface for making a connection with an external device such as the sensor 10.

Figure 3:
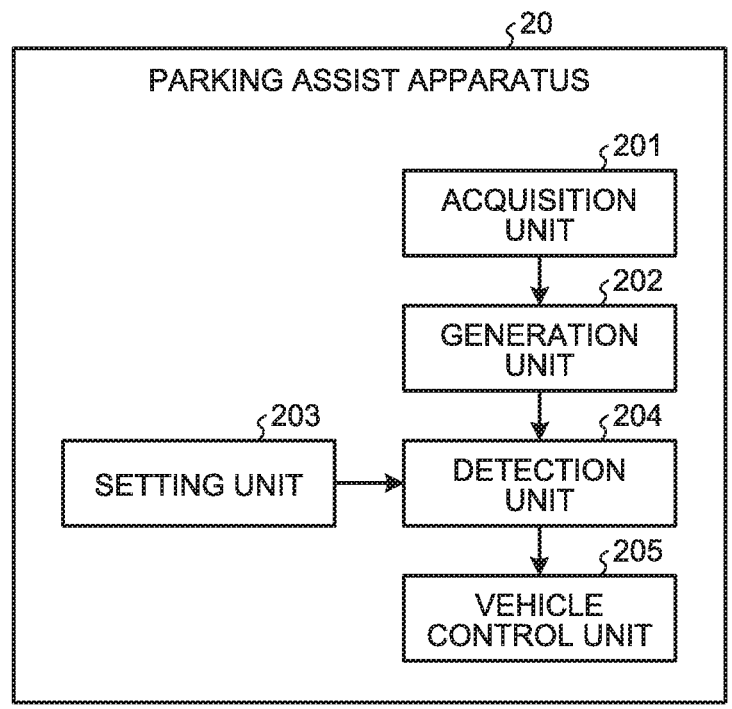
FIG. 3 is a diagram illustrating an example of functions of the parking assist apparatus according to the first embodiment.

FIG. 3 is a diagram illustrating an example of functions of the parking assist apparatus 20. In the example of FIG. 3, exemplified are only functions related to the present embodiment, but the functions of the parking assist apparatus 20 are not limited thereto. As illustrated in FIG. 3, the parking assist apparatus 20 includes an acquisition unit 201, a generation unit 202, a setting unit 203, a detection unit 204, and a vehicle control unit 205.

The acquisition unit 201 acquires a detection result obtained by the sensor 10. In this example, the sensor 10 is a radar, and captures a signal reflected from the object, determines a relative distance, a relative speed, power, and an azimuth of a reflection point (object), and outputs a determination result thereof for each frame. For example, the sensor 10 determines the relative distance and the relative speed based on beats of a transmission signal and a reception signal using frequency modulation, and determines the power based on reflection intensity. The azimuth can be determined based on a difference between signals that are respectively received by a plurality of antennas. The determination result is obtained for each captured signal. In this case, the acquisition unit 201 acquires, from the sensor 10, the determination result for one or more reflection points captured by the sensor 10 for each frame. In the following description, a set of determination results (a set in units of one frame) for one or more reflection points captured by the sensor 10 may be referred to as a "sensing list" in some cases. In this case, the determination result for one reflection point may be assumed to correspond to "the detection result obtained by the sensor 10", or the sensing list (a set of determination results for one or more reflection points) may be assumed to correspond to "the detection result obtained by the sensor 10".

The generation unit 202 generates map information representing a presence probability of an object for each of divided regions obtained by dividing a region around the vehicle based on the detection result obtained by the sensor 10 acquired by the acquisition unit 201. In this example, the map information is an occupancy grid map (OGM). The occupancy grid map is a map in which the presence probability of an object is assigned to each of grids (corresponding to "divided regions") dividing a region around the vehicle.

As a method of setting the presence probability, for example, the presence probability is increased for a grid corresponding to the reflection point detected by the sensor 10, while the presence probability is decreased for a grid located between the sensor 10 and the grid corresponding to the reflection point in a direction toward the reflection point (a direction from the sensor 10 toward the reflection point). The presence probability is maintained for a grid more distant from the sensor 10 than the grid corresponding to the reflection point in a direction toward the reflection point detected by the sensor 10. This is because a state of a place more distant from the host vehicle than the object is blocked by the object and cannot be checked, so that the state is unknown. When the sensor 10 is moving, by integrating presence probabilities of respective grids in a time series manner while considering movement information such as a moving distance and a moving direction of the sensor 10 (movement information of the vehicle), accuracy in the presence probability of each grid is improved with a lapse of time. In this case, every time when the acquisition unit 201 acquires the sensing list for each frame from the sensor 10, the generation unit 202 updates the presence probability of each grid while considering the movement information of the host vehicle. As a method of generating the occupancy grid map, various known techniques can be utilized.

Figure 4:
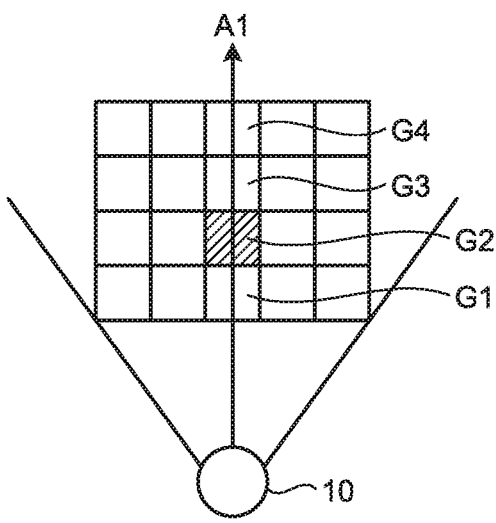
FIG. 4 is a schematic diagram for explaining a method of setting a presence probability for each grid according to the first embodiment.

FIG. 4 is a schematic diagram for explaining the method of setting the presence probability of each grid according to the present embodiment. The following describes the method of setting the presence probability for respective grids G1 to G4 in a detection direction A1 of the sensor 10 with reference to FIG. 4. In this example, the generation unit 202 increases the presence probability for the grid G2 on the assumption that the reflection point detected by the sensor 10 corresponds to the grid G2. In this example, a value of the presence probability to be assigned to each grid is assumed to be in a range from −100 to +100, and an initial value is assumed to be "unknown" and set to be "0". Every time when the sensor 10 detects the reflection point, the generation unit 202 increases the presence probability (represented by log-odds) to be assigned to the grid corresponding to the detected reflection point. In this example, the generation unit 202 increases the presence probability assigned to the grid G2. The generation unit 202 decreases the presence probability assigned to the grid G1 located between the sensor 10 and the grid G2. The generation unit 202 maintains presence probabilities of the grids G3 and G4 that are more distant from the sensor 10 than the grid G2 in the detection direction A1. In this way, the generation unit 202 can set the presence probability of each grid.

In this example, the generation unit 202 determines, for each grid, a state of the grid based on the presence probability assigned to the grid. In this case, states of the grid include an "occupied" state representing a state in which the object is present, an "unoccupied" state representing a state in which the object is not present, and an "unknown" state in which whether the object is present is unknown. For each grid, the generation unit 202 can determine that the state of the grid is the "occupied" state in a case in which the presence probability for the grid is equal to or larger than a first threshold, determine that the state of the grid is the "unoccupied" state in a case in which the presence probability for the grid is equal to or smaller than a second threshold (<first threshold), and determine that the state of the grid is the "unknown" state in a case in which the presence probability for the grid is larger than the second threshold and smaller than the first threshold. In this case, a shade of each grid included in the occupancy grid map is represented by any of three types of density values (pixel values) corresponding to the three states including the "occupied" state, the "unknown" state, and the "unoccupied state" one-to-one.

Additionally, for each of the grids included in the occupancy grid map, the generation unit 202 counts the number of times when the presence probability is increased (hereinafter, referred to as "Occupied Hit Count"), that is, the number of times when presence of the object is detected, and the number of times when the presence probability is decreased (hereinafter, referred to as "Free Hit Count"), that is, the number of times when absence of the object is detected. In this example, every time when the sensor 10 detects the object, the generation unit 202 counts up Occupied Hit Count for the grid corresponding to the detected object (reflection point), and counts up Free Hit Count for the grid located between the sensor 10 and the grid corresponding to the detected object. That is, in this example, it can be considered that presence of the object is detected for the grid corresponding to the detected object (reflection point), and absence of the object is detected for the grid located between the sensor 10 and the grid corresponding to the detected object, every time when the sensor 10 detects the object.

Returning to FIG. 3, the description will be continued. The setting unit 203 defines a first straight line described later, and sets an effective range indicating a range to be a detection target for detecting whether a vacant parking space is present in the occupancy grid map. In this example, the setting unit 203 sets, as the effective range for detecting a vacant parking space, a predetermined range in a direction determined in advance with respect to the straight advancing direction of the host vehicle in the occupancy grid map. However, the embodiment is not limited thereto, and the method of setting the effective range is optional. For example, the setting unit 203 may be configured to set the effective range in accordance with an input from the user.

The detection unit 204 defines a plurality of first straight lines (virtual straight lines) having different intercepts for each of one or more angles to the straight advancing direction of the vehicle in the occupancy grid map, and detects whether a vacant parking space is present at the angle based on the presence probability of the object assigned to the grid belonging to each of the first straight lines.

In the present embodiment, the detection unit 204 defines the first straight lines, whose intercepts differ from each other, with one or more angles to the straight advancing direction of the vehicle in the occupancy grid map, and detects whether a vacant parking space is present at the angle based on the number of grids from which presence of the object is detected or the number of grids from which absence of the object is detected, the grids belonging to the respective first straight lines. More specifically, the detection unit 204 defines the first straight lines and detects whether a vacant parking space is present at the angle for each of the one or more angles in the effective range set by the setting unit 203 in the occupancy grid map. The following describes specific content.

Figure 5:
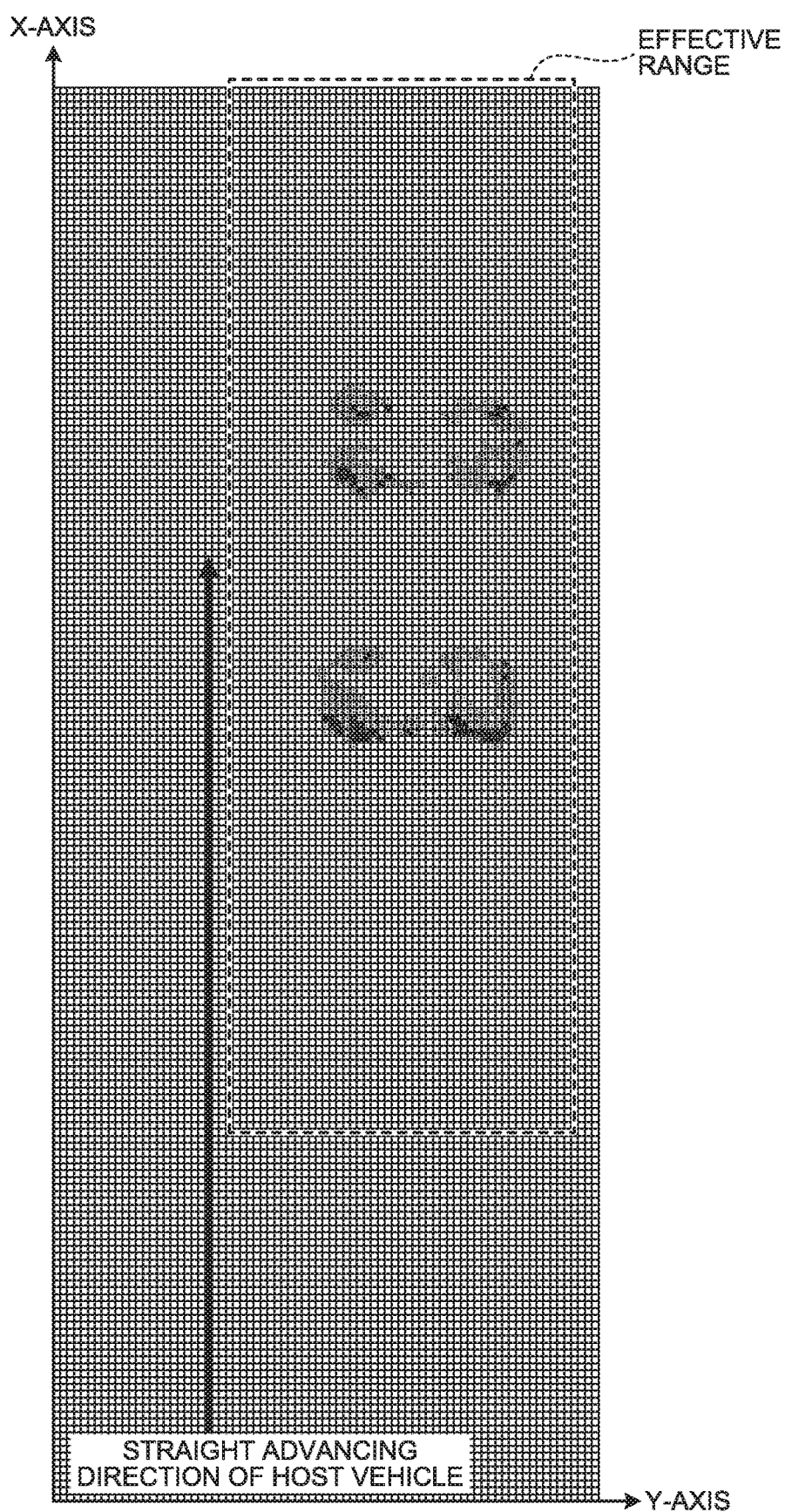
FIG. 5 is a schematic diagram of an occupancy grid map generated in the first embodiment.

FIG. 5 is a schematic diagram of the occupancy grid map generated by the generation unit 202 at a certain time point. A direction of the Y-axis illustrated in FIG. 5 corresponds to a right and left direction of the host vehicle (a lateral direction of the vehicle), and a direction of the X-axis illustrated in FIG. 5 corresponds to a direction parallel with the straight advancing direction of the host vehicle (a front and rear direction of the vehicle). In this case, a grid indicating the "occupied" state described above is displayed in dark, a grid indicating the "unknown" state described above is displayed in an intermediate color (gray), and a grid indicating the "unoccupied" state described above is displayed in white.

The detection unit 204 defines first straight lines, whose intercepts differ from each other, with one or more angles θ to the straight advancing direction of the vehicle in the effective range in the occupancy grid map. The detection unit 204 may define the first straight lines for each of the angles θ in increments of, for example, 2 degrees in a range from 0 to 60 degrees. However, the embodiment is not limited thereto, and a method of setting the angle θ (θ: a variable) is optional.

Figure 6:
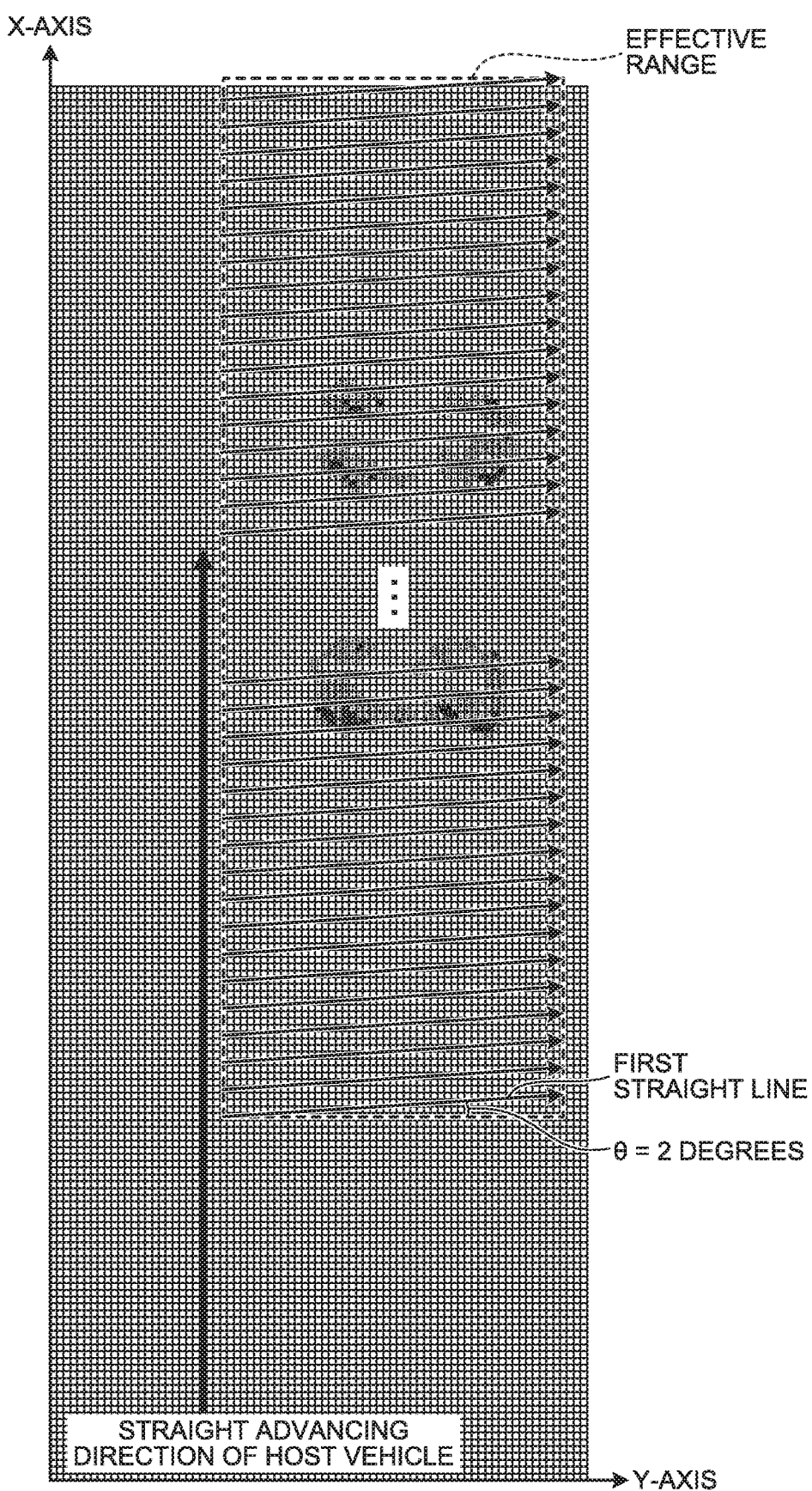
FIG. 6 is a diagram illustrating first straight lines with θ=2 degrees.

In this case, the value of the X-axis in the effective range corresponds to the intercept of the first straight line, and the detection unit 204 defines the first straight line for each value in the X-axis direction in the effective range. That is, the detection unit 204 defines the first straight lines whose intercepts differ from each other in the effective range of the occupancy grid map. In this case, the intercept of the first straight line is an intersection point of the first straight line and a coordinate axis of the effective range (in this example, the X-axis parallel with the straight advancing direction of the host vehicle). FIG. 6 is a diagram illustrating the first straight lines with θ=2 degrees, and the first straight line with θ=2 degrees is defined for each value in the X-axis direction in the effective range. Similarly, for the other angle θ, the first straight line the angle of which with respect to the straight advancing direction of the vehicle is equal to the other angle θ is defined for each value in the X-axis direction in the effective range.

Figure 7:
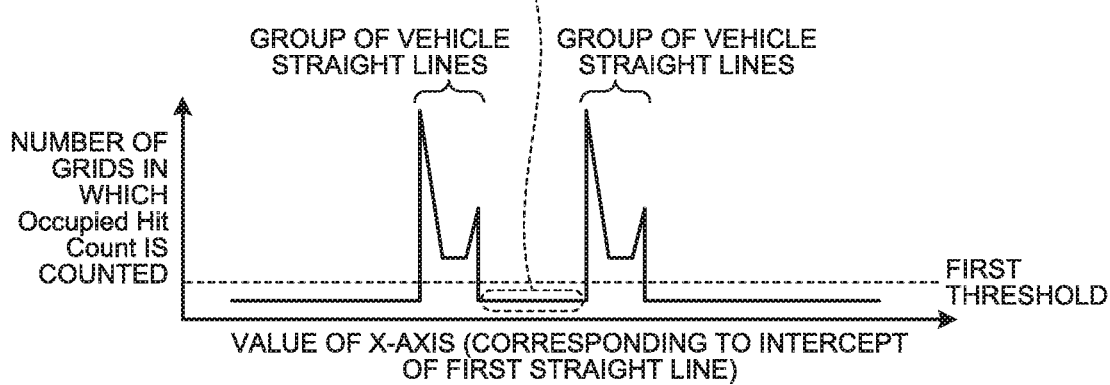
FIG. 7 is a diagram illustrating an example of a relation between a value of an X-axis in an effective range and the number of grids to which the presence probability "1" is assigned that are present on the first straight line the intercept of which is the value of the X-axis.

The detection unit 204 then counts the number of grids from which presence of the object is detected (the number of grids in which Occupied Hit Count is counted) for each first straight line, the grids belonging to each of the first straight lines defined at the angle θ, for each of the one or more angles θ, for example, for each of the angles θ in increments of 2 degrees in the range from 0 degrees to 60 degrees. As described above, each of the first straight lines defined at a certain angle θ corresponds to any of values in the X-axis direction in the effective range, so that, as illustrated in FIG. 7, the number of grids in which Occupied Hit Count is counted can be obtained for each of the values in the X-axis direction in the effective range, the grids present on the first straight line having the value of the X-axis as the intercept. It can be said that the object may be present with high possibility on the first straight line on which the number of grids in which Occupied Hit Count is counted is large, and the object may be present with low possibility on the first straight line on which the number of grids in which Occupied Hit Count is counted is small.

When there are first straight lines on which the number of grids in which Occupied Hit Count is counted is smaller than the first threshold, the number of the first straight lines exceeding a first number, between two first straight lines on which the number of grids in which Occupied Hit Count is counted is equal to or larger than the first threshold among the first straight lines corresponding to any of the one or more angles θ, the detection unit 204 detects presence of a vacant parking space at the angle θ. The first threshold is sufficient to be a value for detecting presence of the object, and can be optionally set. The first number is sufficient to be a value for detecting a region corresponding to the vacant parking space (a region in which an object is not present), and can be optionally set.

In this case, it is assumed that the two first straight lines on which the number of grids in which Occupied Flit Count is counted is equal to or larger than the first threshold correspond to edges of two vehicles adjacent to each other across a vacant parking space. However, for preventing erroneous detection caused by noise and the like, when there are first straight lines on which the number of grids in which Occupied Hit Count is counted is smaller than the first threshold, the number of the first straight lines exceeding the first number, between two groups of first straight lines including a predetermined number of continuous first straight lines on which the number of grids in which Occupied Hit Count is counted is equal to or larger than the first threshold, presence of a vacant parking space may be detected at the angle of a group of the first straight lines. When there are a predetermined number of continuous first straight lines on which the number of grids in which Occupied Hit Count is counted is equal to or larger than the first threshold, an object such as a vehicle may be present with high possibility. Accordingly, by determining whether there are first straight lines on which the number of grids in which Occupied Hit Count is counted is smaller than the first threshold, the number of the first straight lines exceeding the first number, between the groups of first straight lines (a group of vehicle straight lines), detection accuracy for a vacant parking space between two vehicles can be improved.

Figure 8:
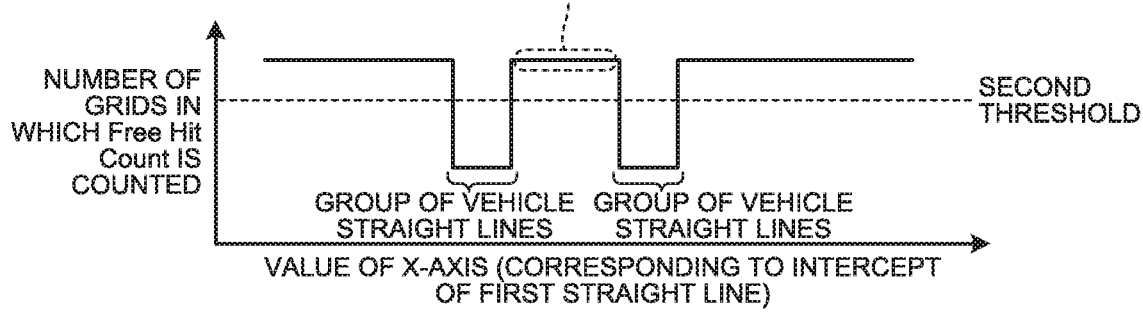
FIG. 8 is a diagram illustrating an example of a relation between the value of the X-axis in the effective range and the number of grids to which the presence probability "0" is assigned that are present on the first straight line the intercept of which is the value of the X-axis.

The detection unit 204 also counts, for each of the one or more angles θ, the number of grids from which absence of the object is detected (the number of grids in which Free Hit Count is counted) belonging to each of the first straight lines defined at the angle θ for each of the first straight lines. As described above, each of the first straight lines defined at a certain angle θ corresponds to any of the values in the X-axis direction in the effective range, so that, as illustrated in FIG. 8, the number of grids in which Free Hit Count is counted can be obtained for each of the values in the X-axis direction in the effective range, the grids present on the first straight line having the value of the X-axis as the intercept. It can be said that the object may be present with low possibility on the first straight line on which the number of grids in which Free Hit Count is counted is large, and the object may be present with high possibility on the first straight line on which the number of grids in which Free Hit Count is counted is small.

When there are first straight lines on which the number of grids in which Free Hit Count is counted is equal to or larger than the second threshold, the number of the first straight lines exceeding a second number, between two first straight lines on which the number of grids in which Free Hit Count is counted is smaller than the second threshold among the first straight lines corresponding to any of the one or more angles θ, the detection unit 204 can detect presence of a vacant parking space at the angle θ. The second threshold is sufficient to be a value for detecting presence of the object, and can be optionally set. The second number is sufficient to be a value for detecting a region corresponding to the vacant parking space, and can be optionally set.

In this case, it is assumed that the two first straight lines on which the number of grids in which Free Hit Count is counted is smaller than the second threshold correspond to edges of two vehicles adjacent to each other across a vacant parking space. However, to prevent erroneous detection caused by noise and the like, for example, in a case in which there are first straight lines on which the number of grids in which Free Hit Count is counted is equal to or larger than the second threshold, the number of the first straight lines exceeding the second number, between two groups of first straight lines including a predetermined number of continuous first straight lines on which the number of grids in which Free Hit Count is counted is smaller than the second threshold, presence of a vacant parking space may be detected at the angle θ of a group of the first straight lines. In a case in which there are a predetermined number of continuous first straight lines on which the number of grids in which Free Hit Count is counted is smaller than the second threshold, the object such as a vehicle may be present with high possibility. Accordingly, by determining whether there are first straight lines on which the number of grids in which Free Hit Count is counted is equal to or larger than the second threshold, the number of the first straight lines exceeding the second number, between the groups of first straight lines (a group of vehicle straight lines), detection accuracy for a vacant parking space between two vehicles can be improved.

In the present embodiment, the detection unit 204 determines an angle at which a vacant parking space is present by combining the determination method described above with reference to FIG. 7 and the determination method described above with reference to FIG. 8. That is, the detection unit 204 detects that a vacant parking space is present at a certain angle θ in a case in which there are first straight lines on which the number of grids in which Occupied Hit Count is counted is smaller than the first threshold, the number of the first straight lines exceeding the first number, between two first straight lines on which the number of grids in which Occupied Hit Count is counted is equal to or larger than the first threshold, and there are first straight lines on which the number of grids in which Free Hit Count is counted is equal to or larger than the second threshold, the number of the first straight lines exceeding the second number, between two first straight lines on which the number of grids in which Free Hit Count is counted is smaller than the second threshold, among the first straight lines corresponding to the certain angle θ.

In the following description, the series of processing described above for determining whether a vacant parking space is present at the angle θ for each of one or more angles θ may be referred to as Parking Space Detection (PSD) determination in some cases. That is, PSD determination at a certain angle θ means processing of determining whether a vacant parking space is present at the certain angle θ by defining the first straight lines corresponding to the certain angle θ, and determining whether there are first straight lines on which the number of grids in which Occupied Hit Count is counted is smaller than the first threshold, the number of the first straight lines exceeding the first number, between two first straight lines on which the number of grids in which Occupied Hit Count is counted is equal to or larger than the first threshold among the first straight lines, and there are first straight lines on which the number of grids in which Free Hit Count is counted is equal to or larger than the second threshold, the number of the first straight lines exceeding the second number, between two first straight lines on which the number of grids in which Free Hit Count is counted is smaller than the second threshold.

The embodiment is not limited thereto. For example, the detection unit 204 may be configured to detect that a vacant parking space is present at a certain angle θ without considering the number of grids in which Free Hit Count is counted in a case in which there are first straight lines on which the number of grids in which Occupied Hit Count is counted is smaller than the first threshold, the number of the first straight lines exceeding the first number, between two first straight lines on which the number of grids in which Occupied Hit Count is counted is equal to or larger than the first threshold, among the first straight lines corresponding to the certain angle θ. Similarly, for example, the detection unit 204 may be configured to detect that a vacant parking space is present at a certain angle θ without considering the number of grids in which Occupied Hit Count is counted in a case in which there are first straight lines on which the number of grids in which Free Hit Count is counted is equal to or larger than the second threshold, the number of the first straight lines exceeding the first number, between two first straight lines on which the number of grids in which Free Hit Count is counted is smaller than the second threshold, among the first straight lines corresponding to the certain angle θ.

In this way, when detecting a vacant parking space, the detection unit 204 transmits the detection result to the vehicle control unit 205. The vehicle control unit 205 assumes the vacant parking space detected by the detection unit 204 as a target parking position, calculates a route from a present position of the vehicle to the target parking position, and performs control for guiding the vehicle along the route. Various configurations can be assumed as the control for guiding the vehicle. For example, assumed is control of displaying a calculated route for assisting a driving operation for parking performed by a driver, or control of automatically driving the vehicle along the calculated route without a driving operation performed by a driver.

The respective functions of the acquisition unit 201, the generation unit 202, the setting unit 203, the detection unit 204, and the vehicle control unit 205 included in the parking assist apparatus 20 described above are implemented when the CPU 21 executes a computer program stored in the storage unit 22. However, the embodiment is not limited thereto, and part or all of the functions of the respective units described above can be implemented by a dedicated hardware circuit, for example.

As described above, in this example, the parking assist apparatus 20 corresponds to the "vacant parking space detection apparatus" for detecting a vacant parking space. Alternatively, an apparatus including the acquisition unit 201, the generation unit 202, the setting unit 203, and the detection unit 204 described above may be disposed separately from the parking assist apparatus 20, for example. In this configuration, the apparatus corresponds to the "vacant parking space detection apparatus". For example, the acquisition unit 201, the generation unit 202, the setting unit 203, and the detection unit 204 described above may be mounted on a plurality of apparatuses in a distributed manner. That is, the configuration may be a system functioning as the "vacant parking space detection apparatus".

Figure 9:
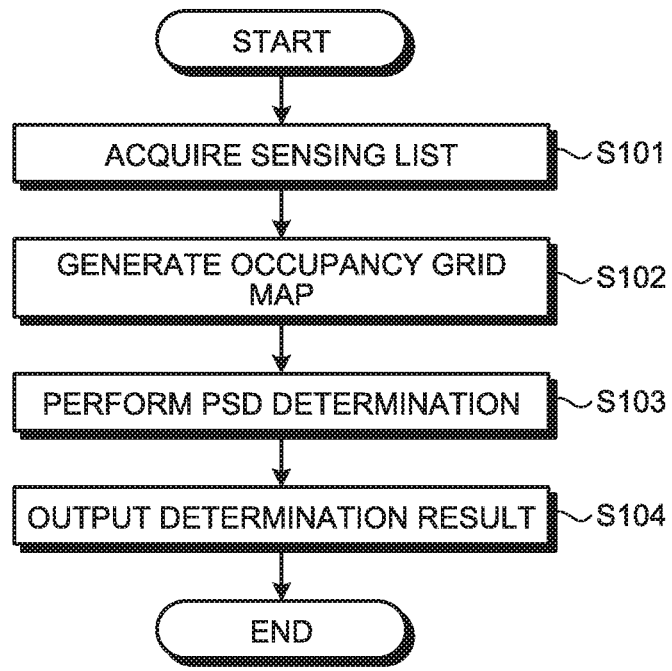
FIG. 9 is a flowchart illustrating an example of processing for detecting a vacant parking space performed by the parking assist apparatus according to the first embodiment.

FIG. 9 is a flowchart illustrating an example of processing for detecting a vacant parking space performed by the parking assist apparatus 20 according to the present embodiment. For example, the parking assist apparatus 20 may be configured to start the processing of FIG. 9 in a case of receiving an execution instruction for a function of finding a vacant parking space to assist parking from a driver. For example, the driver can input the execution instruction for the function by pressing down a button for receiving an execution instruction for the function of finding a vacant parking space to assist parking, but the embodiment is not limited thereto. A method of inputting the execution instruction for the function is optional. For example, a voice input, an input corresponding to a driving condition, and the like may be used.

In the example of FIG. 9, illustrated is processing in units of one frame performed by one sensor 10. In a case in which a plurality of sensors 10 are attached to the vehicle, the processing in units of one frame illustrated in FIG. 9 is repeatedly performed for each of the sensors 10.

As illustrated in FIG. 9, the acquisition unit 201 first acquires the sensing list described above from the sensor 10 (Step S101). Next, the generation unit 202 generates the occupancy grid map described above based on the sensing list acquired at Step S101 (Step S102). Next, the detection unit 204 performs the PSD determination described above on the effective range set by the setting unit 203 in the occupancy grid map generated at Step S102 (Step S103), and outputs a determination result thereof (Step S104). Content of the steps is described above.

As described above, in the present embodiment, the first straight lines are defined, whose intercepts differ from each other with one or more angles θ to the straight advancing direction of the vehicle. Furthermore, it is detected whether a vacant parking space is present at the angle θ is detected based on the number of grids from which presence of the object (the number of grids in which Occupied Hit Count is counted) or based on the number of grids from which absence of the object (the grid in which Free Hit Count is counted), the grids belonging to the respective first straight lines, by using the occupancy grid map that is generated based on the detection result obtained by the sensor 10. Due to this, in determining a vacant parking space, processing of combining the occupancy grid map with a group of virtual parking frames and the like is not required to be performed as in the related art, and a vacant parking space can be determined through processing using only the occupancy grid map. Thus, a processing load for detecting a vacant parking space can be reduced.

First Modification of First Embodiment

The detection unit 204 defines the first straight lines, whose intercepts differ from each other, with one or more angles θ to the straight advancing direction of the vehicle in the occupancy grid map described above, and accumulates presence probabilities for the grids on the respective first straight lines for each first straight line. By determining whether there are first straight lines on which a cumulative value of the presence probability is smaller than a threshold, the number of the first straight lines exceeding a predetermined number, between two first straight lines on which the cumulative value of the presence probability is equal to or larger than the threshold among the first straight lines with a certain angle θ, the detection unit 204 can determine whether a vacant parking space is present at the certain angle θ. The threshold is sufficient to be a value for detecting presence of the object, and can be optionally set. The predetermined number is sufficient to be a value for detecting a region corresponding to a vacant parking space, and can be optionally set.

In summary, it is sufficient that the detection unit 204 has a function of defining the first straight lines, whose intercepts differ from each other, with one or more angles θ to the straight advancing direction of the vehicle in the occupancy grid map described above, and detecting whether a vacant parking space is present at the angle θ based on the presence probability of the object assigned to the grid belonging to each of the first straight lines. With this function, a vacant parking space can be determined through processing using only the occupancy grid map, so that an advantageous effect can be achieved such that a processing load for detecting a vacant parking space can be reduced.

Second Modification of First Embodiment

The detection unit 204 may be configured to determine whether a vacant parking space is present by, for example, obtaining a ratio of the number of grids indicating the "occupied" state described above to the number of target grids that are a certain number of grids in a predetermined range among the grids present on the first straight line. In this configuration, in a case in which there are first straight lines on which the ratio of the grids indicating the "occupied" state is smaller than a threshold, the number of the first straight lines exceeding a predetermined number, between two first straight lines on which the ratio of the grids indicating the "occupied" state is equal to or larger than the threshold among the first straight lines with a certain angle θ, the detection unit 204 can detect that a vacant parking space is present at the certain angle θ. By performing determination using the ratio of the grids indicating the "occupied" state, determination can be performed while being hardly influenced by noise and the like, so that determination accuracy can be improved.

Also in the configuration of detecting a vacant parking space using the ratio (rate) of the grids indicating the "occupied" state as described above, after all, a vacant parking space is detected based on the number of grids from which presence of the object is detected. Thus, it can be considered that the configuration is encompassed by the concept of "detecting, for each of the one or more angles, whether a vacant parking space is present at the angle based on a number of the divided regions (or grids) from which presence of an object is detected, the divided regions belonging to each of the first straight lines with the corresponding angle".

Third Modification of First Embodiment

The detection unit 204 may be configured to determine whether a vacant parking space is present by, for example, obtaining a ratio of the number of grids indicating the "unoccupied" state described above to the number of target grids that are a certain number of grids in a predetermined range among the grids present on the first straight line. In this configuration, in a case in which there are first straight lines on which the ratio of the number of grids indicating the "unoccupied" state is equal to or larger than a threshold, the number of the first straight lines exceeding a predetermined number, between two first straight lines on which the ratio of the number of grids indicating the "unoccupied" state is smaller than the threshold among the first straight lines with a certain angle θ, the detection unit 204 can detect that a vacant parking space is present at the certain angle θ. By performing determination using the ratio of the grids indicating the "unoccupied" state, determination can be performed while being hardly influenced by noise and the like, so that determination accuracy can be improved.

Also in the configuration of detecting a vacant parking space using the ratio of the grids indicating the "unoccupied" state as described above, after all, a vacant parking space is detected based on the number of grids from which absence of the object is detected. Thus, it can be considered that the configuration is encompassed by the concept of "detecting, for each of the one or more angles, whether a vacant parking space is present at the angle based on the number of the divided regions from which absence of an object is detected, the divided regions belonging to each of the first straight lines with the corresponding angle".

Second Embodiment

Next, the following describes a second embodiment. Description about portions common to the first embodiment described above will not be repeated in some cases. In the first embodiment described above, PSD determination is performed while changing the angle θ of the first straight line. However, it may be difficult to obtain a large difference between determination results for adjacent angles such as 0 degrees, 2 degrees, and 4 degrees. That is, angle resolution is poor.

Thus, for example, the detection unit 204 may employ a method of performing Hough transform on target grids from which presence of the object is detected (grids in which Occupied Hit Count is counted) among the grids included in the occupancy grid map, specifying a second straight line including grids in which Occupied Hit Count is counted, the number of the grids exceeding a third number, and detecting whether a vacant parking space is present at the angle θ of the specified second straight line (the angle θ of the second straight line with respect to the straight advancing direction of the vehicle). The third number is sufficient to be a value that can detect presence of the object such as a vehicle or a wall, and can be optionally set. With this method, by specifying the second straight line on which the object may be present with high possibility and performing PSD determination only at the angle θ of the specified second straight line, throughput of PSD determination can be reduced, while improving angle resolution, as compared with the configuration of performing PSD determination for each of all the angles θ determined in advance. Thus, a vacant parking space can be detected efficiently.

For example, in a case in which only one second straight line is specified, PSD determination is performed only at the angle θ of the one second straight line. It can be considered that this configuration is encompassed by the concept of "defining on the map information a plurality of first straight lines, whose intercepts differ from each other, with one or more angles to a straight advancing direction of the vehicle, and detecting whether a vacant parking space is present at the angle based on a presence probability of an object assigned to the divided region (or grids) belonging to each of the first straight lines" (corresponding to a case of including only one angle).

Figure 10:
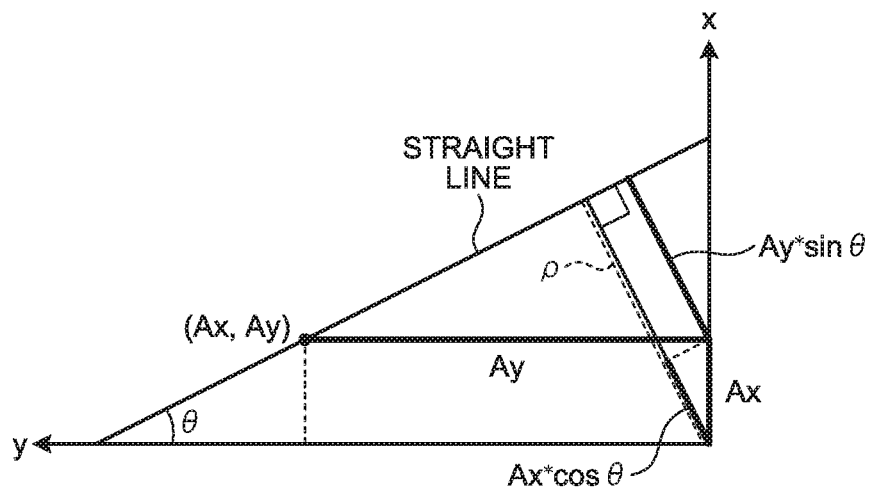
FIG. 10 is a diagram for explaining Hough transform.

The following briefly describes the Hough transform used in the present embodiment. In FIG. 10, assuming that a coordinate point on a certain straight line is (Ax, Ay), a value of ρ represented by the following expression (1) indicates the same value at any coordinate point on the certain straight line. The value of ρ corresponds to a height of a right-angled triangle formed of the certain straight line, the X-axis, and the Y-axis.

$$\rho = Ax^* \cos \theta + Ay^* \sin \theta \quad (1)$$

The above expression (1) is satisfied at any coordinate point on the straight line described above. By utilizing relevance thereof, for example, θ is changed at every step of 1 degree in a range from −40 degrees to +40 degrees in the occupancy grid map, a plurality of values of ρ are obtained for each θ, a set of two-dimensional arrays indicating combinations of ρ and θ is prepared, and an array (ρ, θ) in the set of two-dimensional arrays into which the grid is transformed is counted (voted for) for all grids (corresponding to coordinate points) in which Occupied Hit Count is counted among the grids included in the occupancy grid map. A straight line defined with an array (ρ, θ) having a large number of votes is a straight line on which the object such as a vehicle or a wall may be present with high possibility. The straight line defined with the array (ρ, θ) can be represented by the following expression (2).

$$X = -\tan \theta^* Y + \rho / \cos \theta \quad (2)$$

Figure 11:
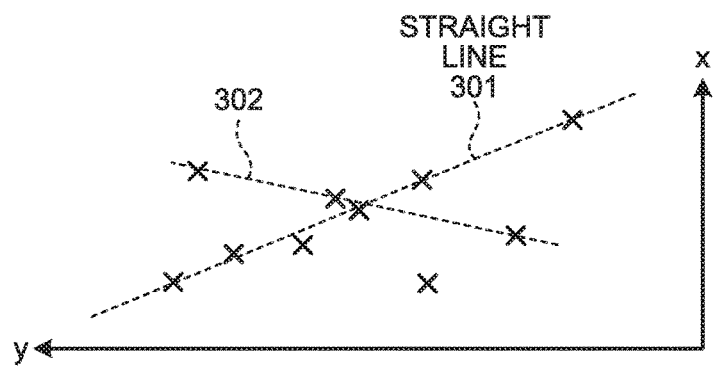
FIG. 11 is a diagram for explaining a method of specifying a second straight line on which the number of votes for grids to which the presence probability "1" of an object is assigned is equal to or larger than a certain number by using Hough transform.

For example, in FIG. 1.1, a coordinate point represented by "×" corresponds to a grid in which Occupied Hit Count is counted. In the example of FIG. 11, a straight line 301 includes more grids to which the presence probability "1" is assigned than that of a straight line 302. That is, the number of votes for (ρ, θ) that defines the straight line 301 is larger than the number of votes for (ρ, θ) that defines the straight line 302. By performing Hough transform as described above, the array (ρ, θ) in which the number of votes for the grids in which Occupied Hit Count is counted is larger than a certain number (corresponding to the third number described above) can be specified from among the set of two-dimensional arrays indicating the combinations of ρ and θ, and a straight line defined with the specified array (ρ, θ) is the second straight line described above.

Figure 12:
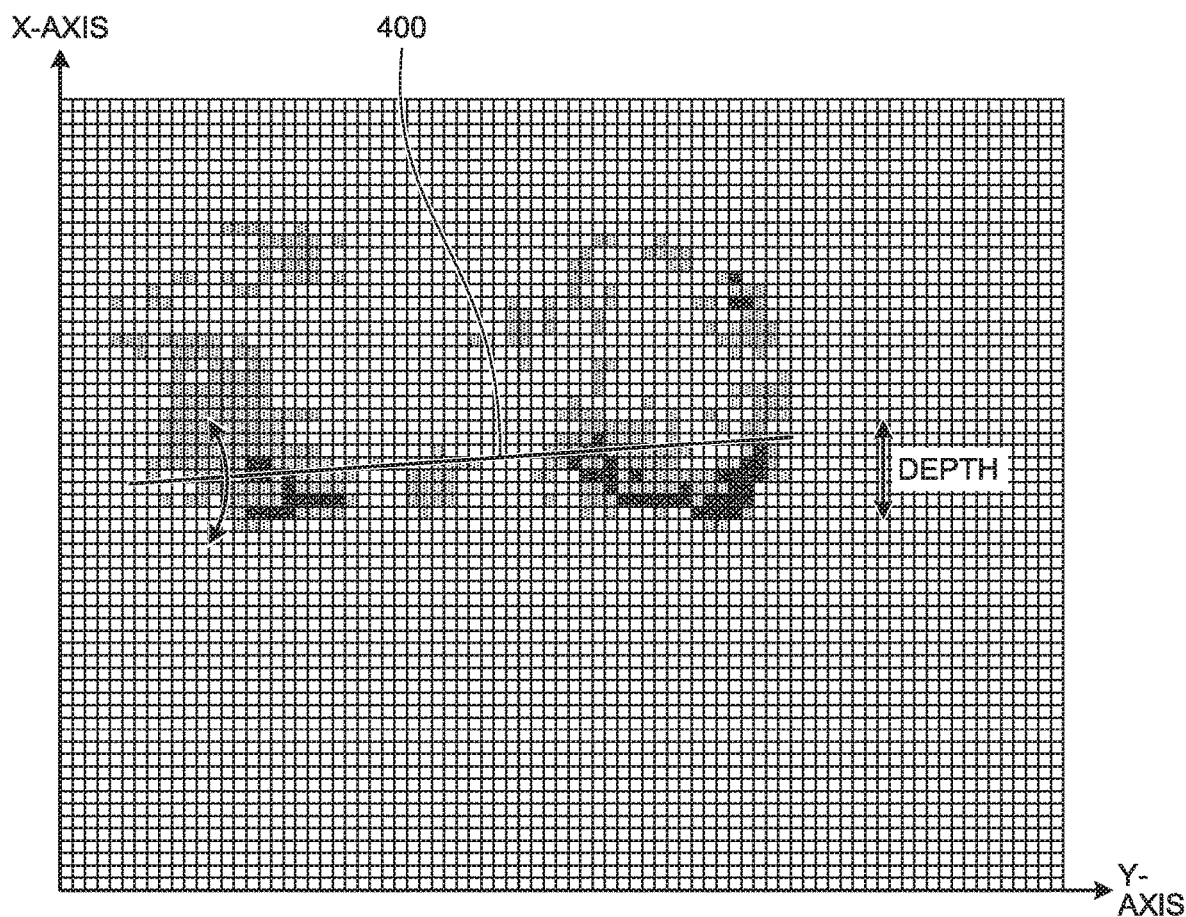
FIG. 12 is a diagram illustrating part of the occupancy grid map in an enlarged manner.

In the present embodiment, the radar is used as the sensor 10. However, radio waves emitted from the radar are not always reflected by an outer edge portion of the vehicle (for example, bumpers on the front and the rear of the vehicle, or doors on the left and the right of the vehicle), and are reflected by any portion of the vehicle such as an engine unit or a back of the vehicle body, for example. Thus, a group of grids corresponding to the reflection points detected by the sensor 10 are present with a certain spread. That is, the detection result obtained by the sensor 10 has a depth. FIG. 12 is a diagram illustrating part of the occupancy grid map in an enlarged manner. For example, assumed is a case in which the Hough transform described above is performed, and a straight line 400 is specified as the second straight line. As described above, the group of grids corresponding to the reflection points detected by the sensor 10, that is, the group of grids in which Occupied Hit Count is counted is present with a spread. Thus, the straight line 400 deviated from a primary edge may be specified as the second straight line in some cases. PSD determination is preferably performed at the angle θ of the edge of the vehicle, so that it is desirable that the second straight line corresponds to the edge of the vehicle. However, accuracy in specifying such a second straight line is not sufficient.

Thus, the detection unit 204 according to the present embodiment differentiates the occupancy grid map to extract an edge portion of the group of grids, and performs Hough transform on the extracted edge portion. That is, the detection unit 204 performs Hough transform on grids the difference of which in presence probability from a surrounding grid is equal to or larger than a third threshold among the grids included in the occupancy grid map, and specifies the second straight line including grids the difference of which in presence probability from a surrounding grid is equal to or larger than the third threshold, the number of the grids exceeding a fourth number, among the grids included in the occupancy grid map. Due to this, accuracy in specifying the second straight line corresponding to the edge of the object such as a vehicle or a wall can be improved. The third threshold described above is sufficient to be a value for extracting the edge portion of the group of grids, and can be optionally set. The fourth number is sufficient to be a value for detecting presence of the object such as a vehicle or a wall, and can be optionally set.

By performing PSD determination only at the angle θ of the specified second straight line, the detection unit 204 can efficiently detect a vacant parking space with high accuracy.

In the present embodiment, a difference in presence probability of each grid included in the occupancy grid map from a grid positioned immediately below the grid is obtained, and Hough transform is performed on the grid the difference of which is equal to or larger than the third threshold. In this example, as the surrounding grid the difference of which from each grid should be taken, a difference from a grid immediately below a target grid is taken. However, the surrounding grid is not limited to the grid immediately below, and can be optionally set based on a design condition and the like. For example, the surrounding grid may be a grid immediately above the target grid, a grid adjacent to the right side thereof, or a grid adjacent to the left side thereof.

Figure 13:
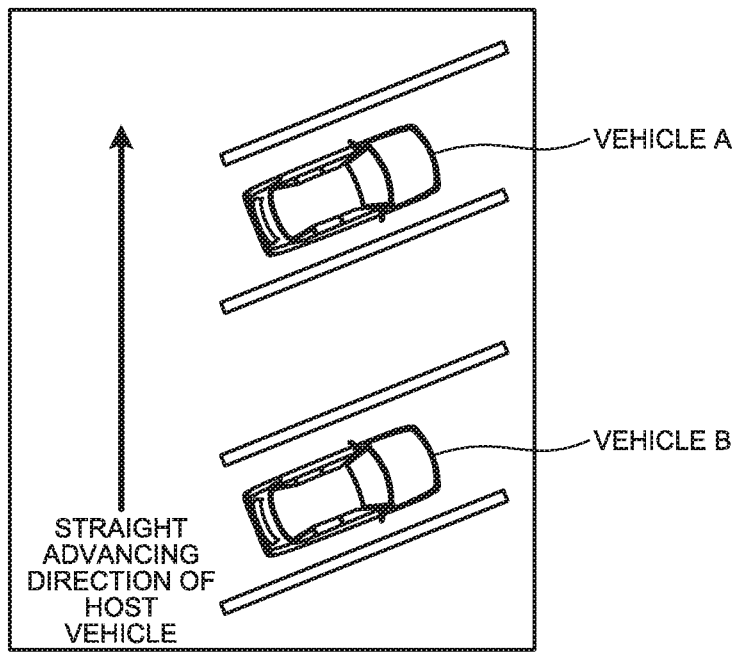
FIG. 13 is a plan view assuming a scene in which two vehicles are obliquely parked in a right region with respect to a straight advancing direction of a host vehicle.
Figure 14:
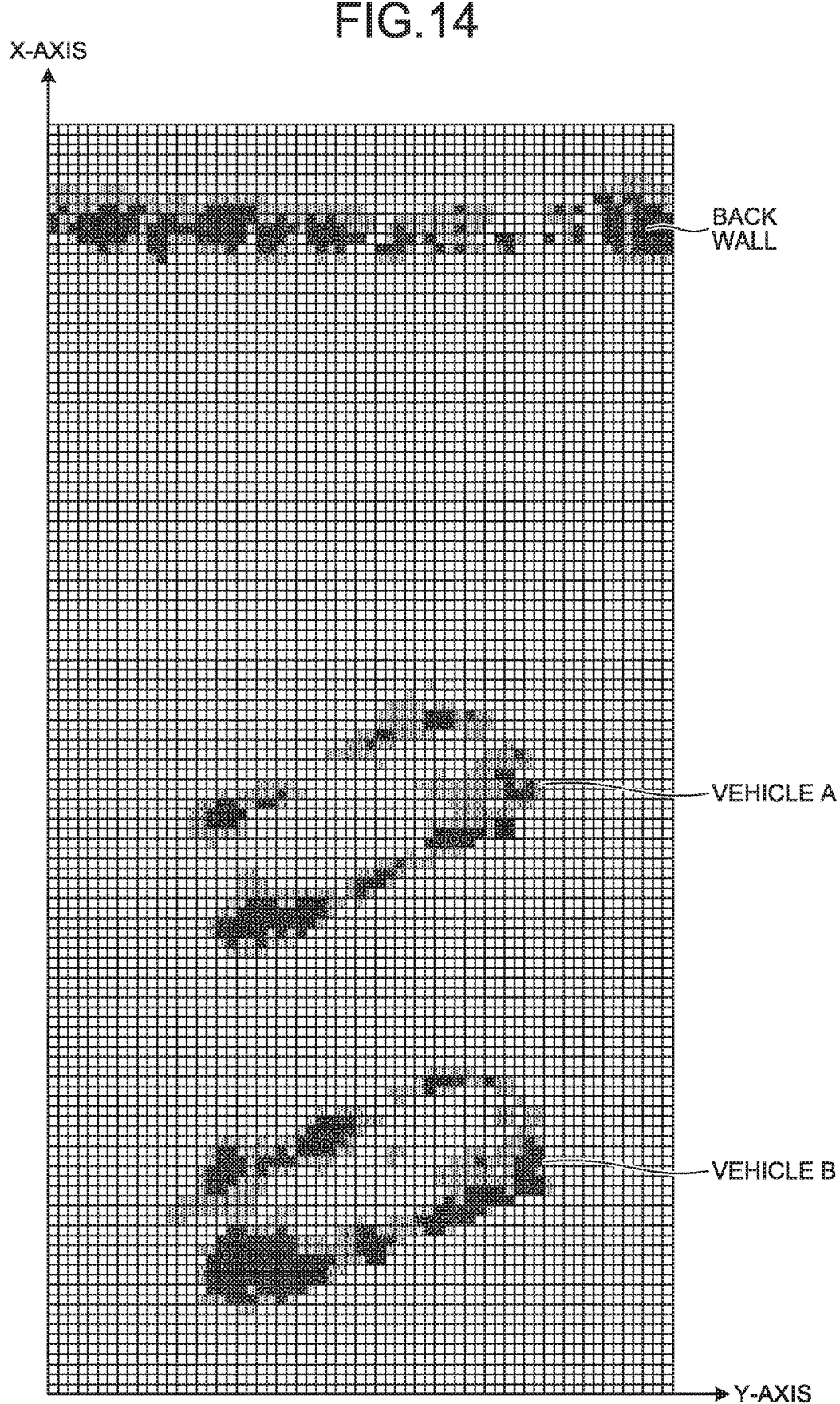
FIG. 14 is a diagram illustrating an example of the occupancy grid map generated in the scene of FIG. 13.
Figure 15:
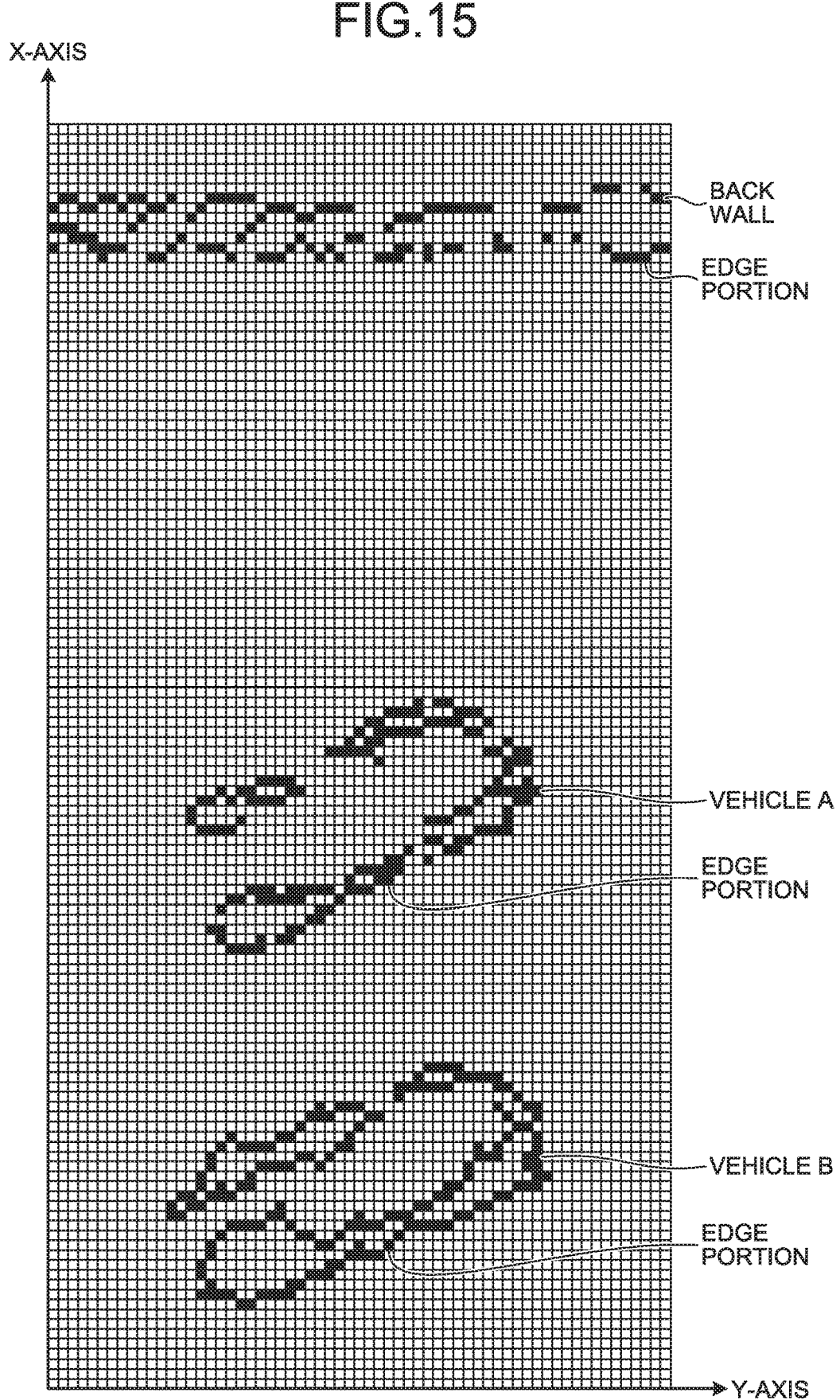
FIG. 15 is a diagram in which a difference in the presence probability from a surrounding grid is obtained for each grid included in the occupancy grid map illustrated in FIG. 14.

As illustrated in a plan view of FIG. 13, a case is assumed, in which two vehicles A and B are obliquely parked in a right region with respect to the straight advancing direction of the host vehicle. In this case, the occupancy grid map generated by the generation unit 202 has a state illustrated in FIG. 14. By obtaining a difference in presence probability of each grid included in the occupancy grid map from a grid positioned immediately below the grid, and assigning a difference value thereof to the grid, the state illustrated in FIG. 15 is obtained. In this way, it is possible to extract the edge portion at which the presence probability assigned to each grid abruptly changes in the occupancy grid map. By performing Hough transform on the grids of the extracted edge portion, the second straight line including a large number of grids of the edge portion can be specified. The second straight line specified as described above may correspond to the edge of the object such as a vehicle and a wall with high possibility. By performing PSD determination only at the angle θ of the second straight line, a vacant parking space can be efficiently detected with high accuracy.

Additionally, in this example, the detection unit 204 lists second straight lines specified as described above. For example, the detection unit 204 may be configured to list the specified second straight lines in descending order of the number of votes. The detection unit 204 then selects a predetermined number of second straight lines the number of votes for which is large from among the one or more listed second straight lines. For example, the detection unit 204 may be configured to select the top one second straight line, or configured to select the top three second straight lines from among a group of the listed second straight lines.

Figure 16:
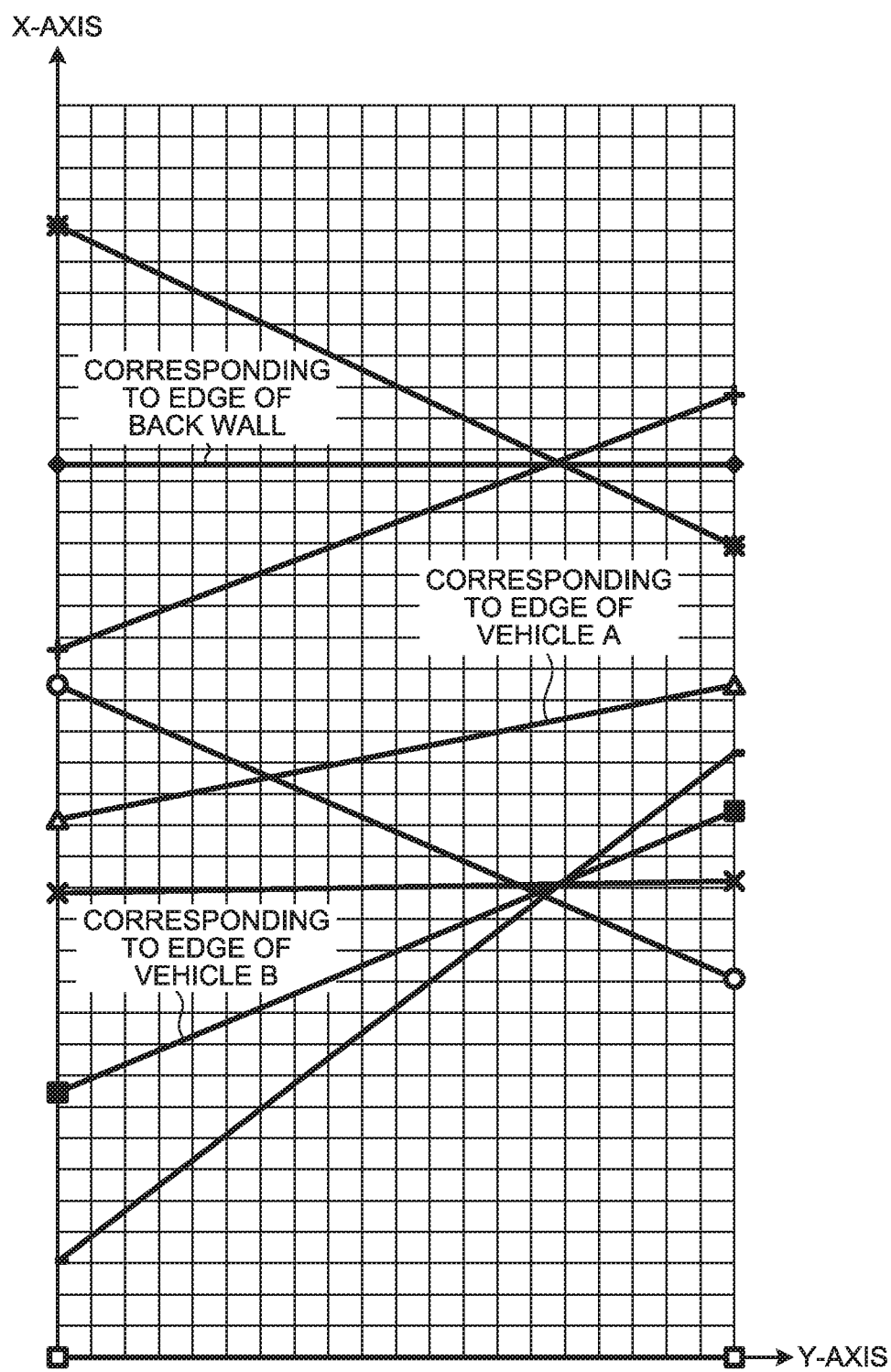
FIG. 16 is a diagram illustrating a state in which ten second straight lines are listed.
Figure 17:
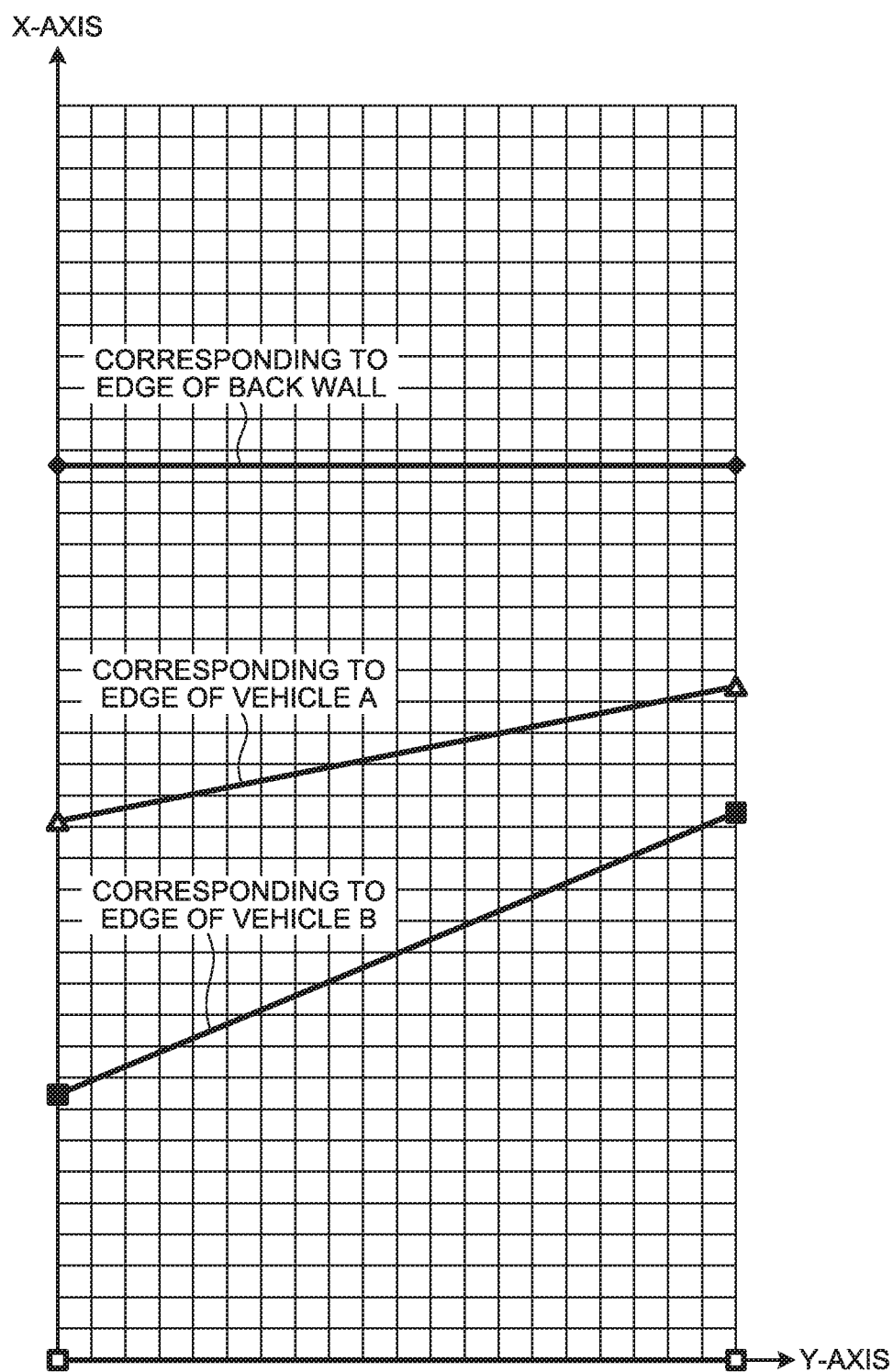
FIG. 17 is a diagram illustrating a state in which a group of straight lines close to a second straight line corresponding to an edge of the vehicle are narrowed.

For example, in a case of performing Hough transform on the group of grids of the edge portion illustrated in FIG. 15 to specify the second straight lines, there may be a case in which ten second straight lines including unnecessary second straight lines are listed in addition to the second straight lines corresponding to the edges of the vehicles A and B as illustrated in FIG. 16. In this case, by selecting the top three second straight lines from among the ten second straight lines that are listed in descending order of the number of votes to exclude unnecessary second straight lines as illustrated in FIG. 17, a group of straight lines close to the second straight lines corresponding to the edges of the vehicles A and B can be narrowed. Due to this, accuracy in specifying the second straight lines corresponding to the edges of the vehicles can be further improved. The number of second straight lines selected from the group of listed second straight lines can be optionally set based on a design condition and the like. The detection unit 204 then performs PSD determination at the angle θ of the second straight line for each of the one or more second straight lines selected as described above.

Figure 18:
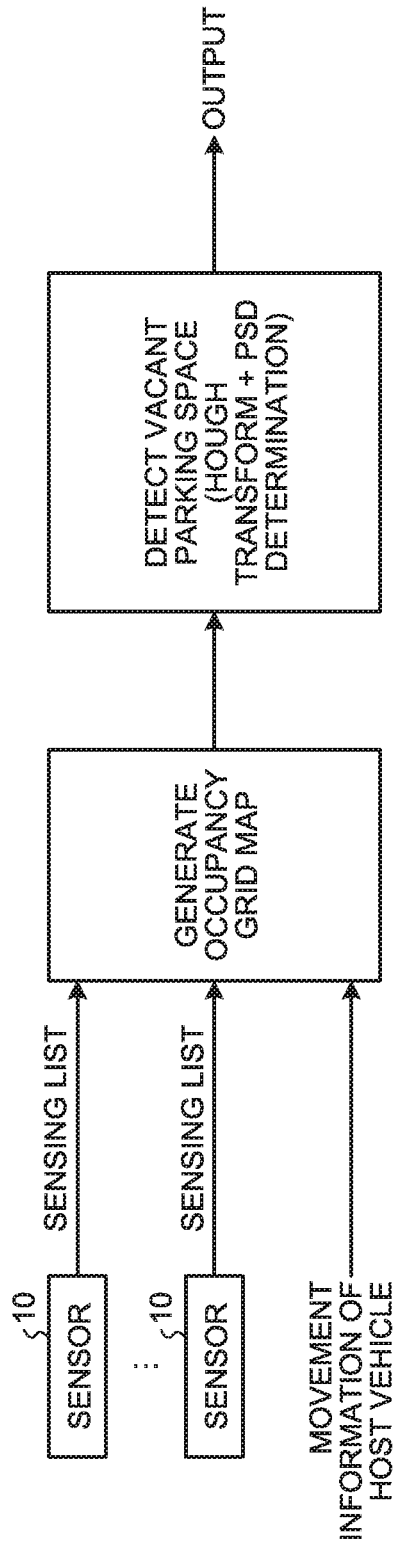
FIG. 18 is a block diagram for explaining a processing procedure for detecting a vacant parking space performed by a parking assist apparatus according to a second embodiment.

FIG. 18 is a block diagram for explaining a processing procedure for detecting a vacant parking space performed by the parking assist apparatus 20 according to the present embodiment. Each sensor 10 inputs the sensing list described above to the parking assist apparatus 20 for each frame, and the parking assist apparatus 20 (generation unit 202) generates the occupancy grid map described above based on the sensing list of each sensor and the movement information of the host vehicle. Next, the parking assist apparatus 20 (detection unit 204) detects a vacant parking space by performing Hough transform and PSD determination using the generated occupancy grid map. That is, after the generation unit 202 generates the occupancy grid map, the detection unit 204 according to the present embodiment specifies the second straight line described above using the generated occupancy grid map, and performs processing of detecting whether a vacant parking space is present (PSD determination) only at the angle θ of the specified second straight line. The following describes more specific content.

Figure 19:
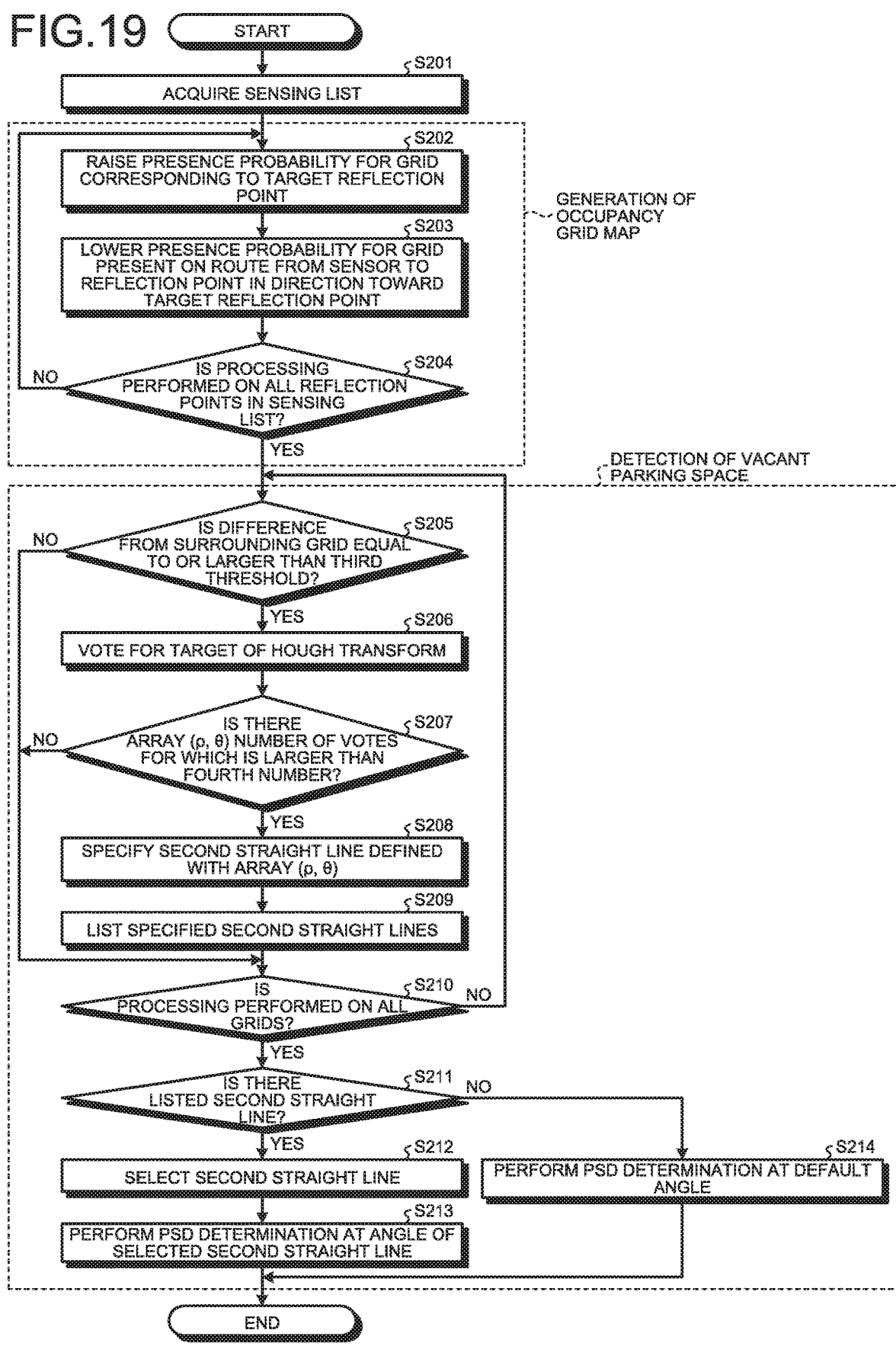
FIG. 19 is a flowchart illustrating an example of processing for detecting a vacant parking space performed by the parking assist apparatus according to the second embodiment.

FIG. 19 is a flowchart illustrating an example of the processing for detecting a vacant parking space performed by the parking assist apparatus 20 according to the present embodiment. The flowchart exemplified in FIG. 19 represents processing in units of one frame performed by one sensor 10.

As illustrated in FIG. 19, the acquisition unit 201 first acquires the sensing list described above from the sensor 10 (Step S201). In this example, the number of reflection points included in the sensing list (the number of determination results for the reflection points) is assumed to be L. The processing at the following Step S202 to Step S204 corresponds to processing of generating the occupancy grid map, and the processing at Step S205 to Step S214 corresponds to processing related to detection of a vacant parking space.

After Step S201, for any one of the reflection points included in the sensing list (hereinafter, referred to as a "target reflection point"), the generation unit 202 raises the presence probability to be assigned to the grid corresponding to the target reflection point among a plurality of grids dividing a region around the host vehicle (Step S202).

Next, the generation unit 202 lowers the presence probability to be assigned to the grid located between the sensor 10 and the target reflection point in a direction toward the target reflection point (Step S203).

Next, the generation unit 202 determines whether the processing at Step S202 and Step S203 described above is performed on all of the reflection points (L reflection points) included in the sensing list acquired at Step S201 (Step S204). When a result obtained at Step S204 is No (No at Step S204), Step S202 and the subsequent processing are repeated. On the other hand, when a result obtained at Step S204 is Yes (Yes at Step S204), generation of the occupancy grid imp is completed, and the process proceeds to Step S205. In this example, the number of grids included in the generated occupancy grid map is assumed to be N×M.

At Step S205, for any one of the grids included in the occupancy grid map generated by the generation unit 202 (hereinafter, referred to as a "target grid"), the detection unit 204 determines whether a difference thereof from a surrounding grid is equal to or larger than the third threshold (Step S205). When a result obtained at Step S205 is No (No at Step S205), the process proceeds to Step S210 described later. On the other hand, when a result obtained at Step S205 is Yes (Yes at Step S205), the detection unit 204 votes for the target grid as a target of Hough transform (Step S206). As described above, the detection unit 204 takes place a vote to determine the array (ρ, θ) in the set of two-dimensional arrays prepared in advance into which the target grid is transformed. In this example, angles to be changed in performing Hough transform are assumed to be $\theta_1$ to $\theta_A$ (the number of angles is A).

After Step S206, the detection unit 204 determines whether there is an array (ρ, θ) the number of votes for which is larger than the fourth number (Step S207). When a result obtained at Step S207 is No (No at Step S207), the process proceeds to Step S210 described later. On the other hand, when a result obtained at Step S207 is Yes (Yes at Step S207), the detection unit 204 specifies the second straight line defined with the array (ρ, θ) the number of votes for which is larger than the fourth number (Step S208), and lists the specified second straight line (Step S209). The process then proceeds to Step S210.

At Step S210, the detection unit 204 determines whether the processing at Step S205 to Step S209 described above is performed on all of the grids (N×M grids) included in the occupancy grid map generated by the generation unit 202 (Step S210). When a result obtained at Step S210 is No (No at Step S210), Step S205 and the subsequent processing are repeated.

On the other hand, when a result obtained at Step S210 is Yes (Yes at Step S210), the detection unit 204 determines whether the second straight line listed at Step S209 is present (Step S211). When a result obtained at Step S211 is Yes (Yes at Step S211), the detection unit 204 selects a predetermined number of second straight lines the number of votes for which is large from among the group of second straight lines listed at Step S209 (Step S212). The detection unit 204 then performs PSD determination on the effective range described above in the occupancy grid map generated through the processing at Step S202 to Step S204 for each angle θ of the predetermined number of second straight lines selected at Step S212 (Step S213). On the other hand, when a result obtained at Step S211 is No (No at Step S211), the detection unit 204 performs PSD determination at a default angle θ on the effective range in the occupancy grid map generated through the processing at Step S202 to Step S204 described above (Step S214). The default angle θ can be optionally set, and for example, the default angle θ may be 0 degrees.

As described above, in the second embodiment, the generated occupancy grid map is differentiated to extract the edge portion of the group of grids, Hough transform is performed on the extracted edge portion, and the second straight line including a large number of grids of the edge portion is specified. Due to this, the second straight line corresponding to the edge of the object such as a vehicle or a wall can be specified with high accuracy. By performing PSD determination only at the angle θ of the specified second straight line, a vacant parking space can be efficiently detected with high accuracy, Modification of Second Embodiment In the second embodiment described above, the detection unit 204 performs Hough transform on the grid the difference in presence probability of the object of which from a surrounding grid is equal to or larger than the third threshold among the grids included in the occupancy grid map described above, but the embodiment is not limited thereto. For example, the detection unit 204 may be configured to perform Hough transform on a grid in which Occupied Hit Count is counted among the grids included in the occupancy grid map. That is, the detection unit 204 may be configured to perform Hough transform without differentiating the occupancy grid map.

In this modification, the detection unit 204 performs Hough transform on the grid in which Occupied Hit Count is counted among the grids included in the occupancy grid map described above, specifies the second straight line including the grids in which Occupied Hit Count is counted, the number of grids exceeding the third number, and detects whether a vacant parking space is present at the angle θ of the specified second straight line. Also with this configuration, by specifying the angle θ of the second straight line on which the object such as a vehicle or a wall may be present with high possibility, and performing PSD determination only at the specified angle θ, a vacant parking space can be detected efficiently. Alternatively, for example, the detection unit 204 may be configured to perform Hough transform on the grid indicating the "occupied" state among the grids included in the occupancy grid map. It can be considered that this configuration is also encompassed by the concept that "Hough transform is performed on the grid from which presence of the object is detected among the grids included in the occupancy grid map".

Third Embodiment

Next, the following describes a third embodiment. Description about portions common to the second embodiment described above will not be repeated in some cases. In the second embodiment described above, after the occupancy grid map is completely generated, PSD determination is performed using the generated occupancy grid map, so that processing related to detection of a vacant parking space depends on an area or resolution of the generated occupancy grid map, and a processing load tends to be large.

Thus, in the third embodiment, the detection unit 204 performs Hough transform to specify the second straight line in parallel with generation of the occupancy grid map performed by the generation unit 202, and performs PSD determination at the angle θ of the specified second straight line. Due to this, a processing speed can also be improved while reducing the processing load of the processing related to detection of a vacant parking space. The following describes more specific content.

As described above, every time when the sensor 10 detects the object, the generation unit 202 counts up Occupied Hit Count for a grid corresponding to the detected object (reflection point), and counts up Free Hit Count for a grid located between the sensor 10 and the grid corresponding to the detected object. That is, every time when the sensor 10 detects the object, presence of the objected is detected for the grid corresponding to the detected object, and absence of the object is detected for the grid located between the sensor 10 and the grid corresponding to the detected object.

Every time when the sensor 10 detects the object, the detection unit 204 updates, for each of one or more angles θ with respect to the straight advancing direction of the vehicle, the number of grids in which Occupied Hit Count is counted on the first straight line for the first straight line including the grid in which Occupied Hit Count is newly counted (presence of the object is newly detected) among the first straight lines corresponding to the angle θ, and updates a first list representing a relation between the first straight lines corresponding to the angle (more specifically, intercepts of the respective first straight lines) and the number of grids in which Occupied Hit Count is counted (a relation in FIG. 7). This update of the first list is performed for each angle θ, but in a case in which the first straight line including the grid in which Occupied Hit Count is newly counted is not present in a plurality of first straight lines corresponding to a certain angle θ, for example, the first list corresponding to the certain angle θ is not updated.

Every time when the sensor 10 detects the object, the detection unit 204 updates, for each of the one or more angles θ, the number of grids in which Free Hit Count is counted on the first straight line for the first straight line including the grid in which Free Hit Count is newly counted (absence of the object is newly detected) among the first straight lines corresponding to the angle θ, and updates a second list representing a relation between the first straight lines corresponding to the angle θ (more specifically, intercepts of the respective first straight lines) and the number of grids in which Free Hit Count is counted (a relation in FIG. 8). This update of the second list is performed for each angle θ, but in a case in which the first straight line including the grid in which Free Hit Count is newly counted is not present in the first straight lines with a certain angle θ, for example, the second list corresponding to the certain angle θ is not updated. In the following description, the first list and the second list described above may be collectively referred to as a "PSD list" in some cases.

In this way, every time when the sensor 10 detects the object, the detection unit 204 updates the PSD list for each of one or more angles θ. In this example, every time presence of the object is detected in a grid in the effective range that is set in advance by the setting unit 203, the detection unit 204 updates the PSD list for each of the one or more angles θ.

In a case in which the second straight line is specified by performing Hough transform in parallel with generation of the occupancy grid map, the detection unit 204 detects whether a vacant parking space is present at the angle θ using the PSD list corresponding to the angle θ of the specified second straight line. In this example, the detection unit 204 detects whether a vacant parking space is present at the angle θ using both of the first list and the second list corresponding to the angle θ of the specified second straight line, but the embodiment is not limited thereto. For example, the detection unit 204 may detect whether a vacant parking space is present at the angle θ using any one of the first list and the second list. In short, in a case in which the second straight line can be specified by performing Hough transform, the detection unit 204 may detect whether a vacant parking space is present at the angle θ using the first list or the second list corresponding to the angle θ of the specified second straight line.

Figure 20:
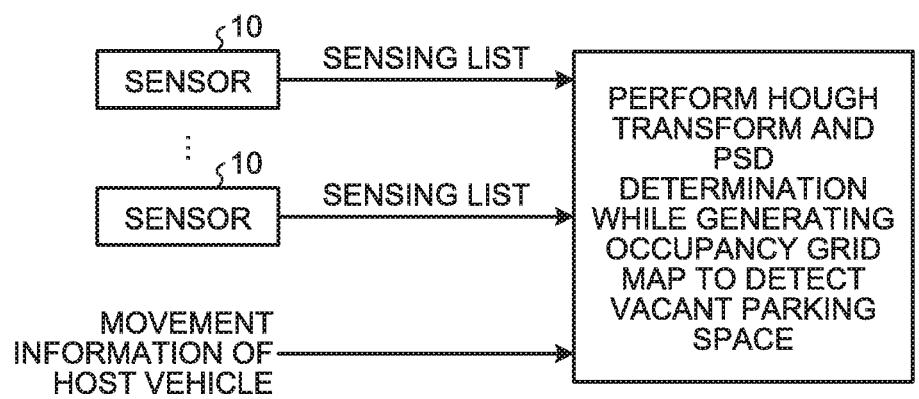
FIG. 20 is a block diagram for explaining a processing procedure for detecting a vacant parking space performed by a parking assist apparatus according to a third embodiment.

FIG. 20 is a block diagram for explaining a processing procedure for detecting a vacant parking space performed by the parking assist apparatus 20 according to the third embodiment. Each sensor 10 inputs the sensing list described above to the parking assist apparatus 20 for each frame, and the parking assist apparatus 20 (generation unit 202) generates the occupancy grid map described above based on the sensing list of each sensor 10 and the movement information of the host vehicle. Next, the parking assist apparatus 20 (detection unit 204) performs Hough transform and PSD determination while generating the occupancy grid map to detect the vacant parking space. The following describes more specific content.

Figure 21:
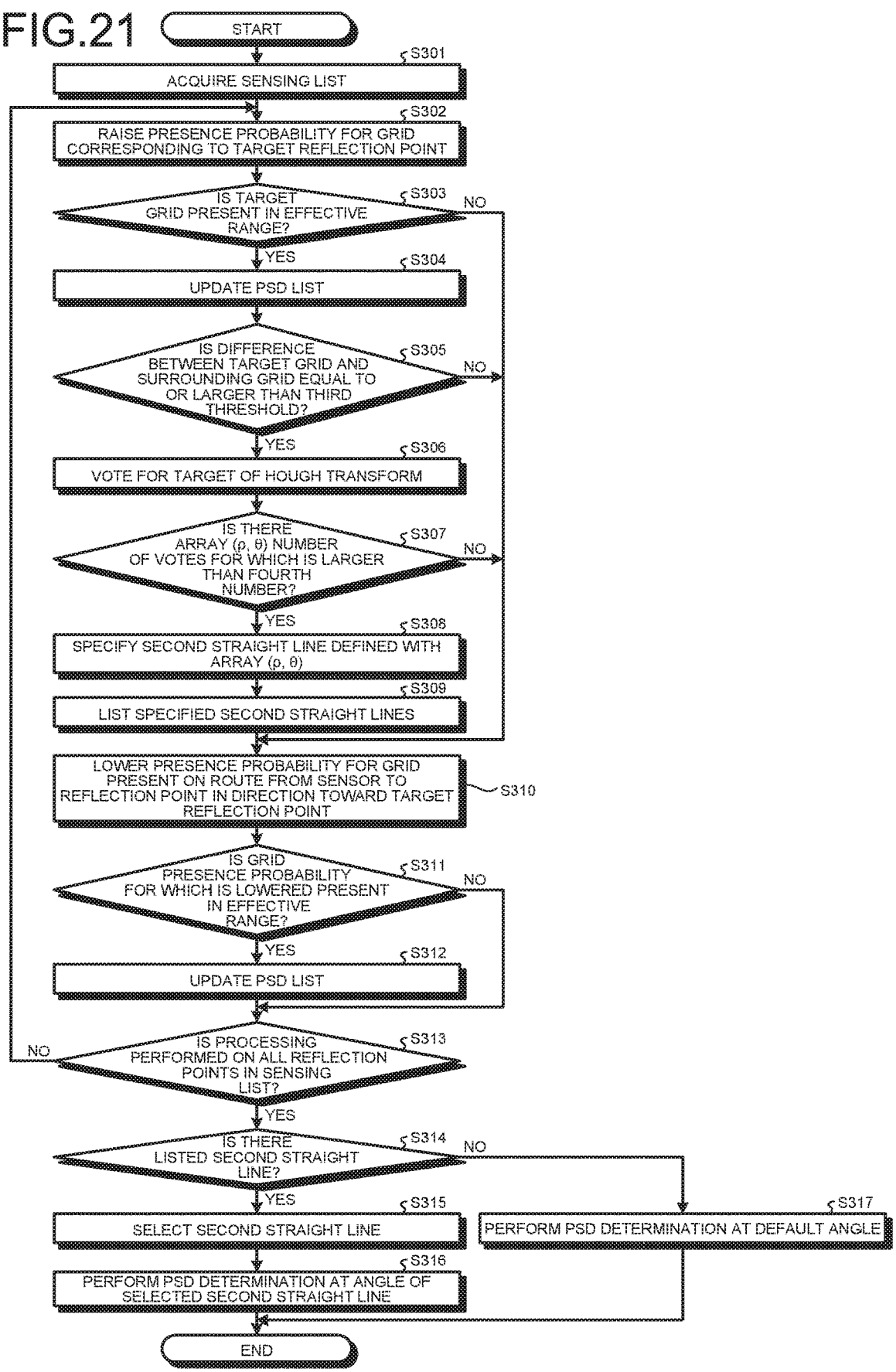
FIG. 21 is a flowchart illustrating an example of processing for detecting a vacant parking space performed by the parking assist apparatus according to the third embodiment.

FIG. 21 is a flowchart illustrating an example of processing for detecting a vacant parking space performed by the parking assist apparatus 20 according to the third embodiment. The flowchart exemplified in FIG. 21 indicates processing in units of one frame performed by one sensor 10. First, the acquisition unit 201 acquires the sensing list described above from the sensor 10 (Step S301). In this example, the number of reflection points included in the sensing list is assumed to be L.

After Step S301, for any one of the reflection points included in the sensing list (hereinafter, referred to as a "target reflection point"), the generation unit 202 raises the presence probability to be assigned to the grid corresponding to the target reflection point (hereinafter, referred to as a "target grid") (Step S302).

Next, the detection unit 204 determines whether the target grid is present in the effective range set by the setting unit 203 described above (Step S303). When a result obtained at Step S303 is Yes (Yes at Step S303), the detection unit 204 updates the PSD list for each of the one or more angles θ (Step S304). More specifically, the detection unit 204 counts up the number of grids in which Occupied Hit Count is counted on the first straight line (one, or a plurality of first straight lines in some cases) to which the target grid belongs, and updates the first list corresponding to the angle θ of the first straight line. In this case, a plurality of angles corresponding to a plurality of PSD lists one-to-one are assumed to be $\theta_1$ to $\theta_B$ (the number of angles is B). In this example, one PSD list is a group of one first list and one second list. The detection unit 204 then determines whether a difference between the target grid and a surrounding grid is equal to or larger than the third threshold (Step S305). In this example, the surrounding grid is a grid immediately below the target grid.

When a result obtained at Step S305 is Yes (Yes at Step S305), the detection unit 204 votes for the target grid as a target of Hough transform (Step S306). As described above, the detection unit 204 takes place a vote to determine the array (ρ, θ) in the set of two-dimensional arrays prepared in advance into which the target grid is transformed. In this example, angles to be changed in performing Hough transform are assumed to be $\theta_1$ to $\theta_A$ (the number of angles is A). In this case, the number of angles to be changed in performing Hough transform is the same as the number of angles corresponding to the PSD lists one-to-one (A=B), but the embodiment is not limited thereto. The numbers of angles may be different from each other. For example, pitches of the angles corresponding to the PSD lists one-to-one may be caused to be larger than a pitch of the angle to be changed in performing Hough transform, and the number of angles corresponding to the PSD lists one-to-one may be caused to be smaller than the number of angles to be changed in performing Hough transform. On the other hand, when a result obtained at Step S305 described above is No (No at Step S305), the process proceeds to Step S310 described later.

After Step S306, the detection unit 204 determines whether there is an array (ρ, θ) the number of votes for which is larger than the fourth number (Step S307). When a result obtained at Step S307 is No (No at Step S307), the process proceeds to Step S310 described later. On the other hand, when a result obtained at Step S307 is Yes (Yes at Step S307), the detection unit 204 specifies the second straight line defined with the array (ρ, θ) the number of votes for which is larger than the fourth number (Step S308), and lists the specified second straight line (Step S309). The process then proceeds to Step S310.

At Step S310, the generation unit 202 lowers the presence probability for the grid located between the sensor 10 and the target grid corresponding to the target reflection point in a direction toward the target reflection point (Step S310).

Next, the detection unit 204 determines whether the grid the presence probability of which is lowered at Step S310 is present in the effective range (Step S311). When a result obtained at Step S311 is Yes (Yes at Step S311), the detection unit 204 updates the PSD list for each of the one or more angles θ (Step S312). More specifically, the detection unit 204 counts up the number of grids in which Free Hit Count is counted on the first straight line (one, or a plurality of first straight lines in some cases) to which the grid the presence probability of which is lowered at Step S310 belongs, and updates the second list corresponding to the angle θ of the first straight line. This processing at Step S312 is performed multiple times corresponding to the number of grids the presence probability of which is lowered at Step S310.

After Step S312, in a case in which the processing at Step S302 to Step S312 described above is not completed for all of the reflection points in the sensing list (No at Step S313), Step S302 and the subsequent processing described above are repeated. The processing at Step S302 to Step S312 described above is completed for all of the reflection points in the sensing list (Yes at Step S313), the process proceeds to Step S314.

At Step S314, the detection unit 204 determines whether the listed second straight line is present. When a result obtained at Step S314 is Yes (Yes at Step S314), the detection unit 204 selects a predetermined number of second straight lines from the group of listed second straight lines (Step S315). A method of selecting the second straight lines is the same as that described in the second embodiment described above. Next, the detection unit 204 performs PSD determination on the effective range described above for each angle θ of the predetermined number of second straight lines selected at Step S315 (Step S316). On the other hand, when a result obtained at Step S314 is No (No at Step S314), the detection unit 204 performs PSD determination on the effective range described above at the default angle θ (Step S317). As described above in the second embodiment, the default angle θ can be optionally set, for example, the default angle θ may be 0 degrees.

Figure 22:
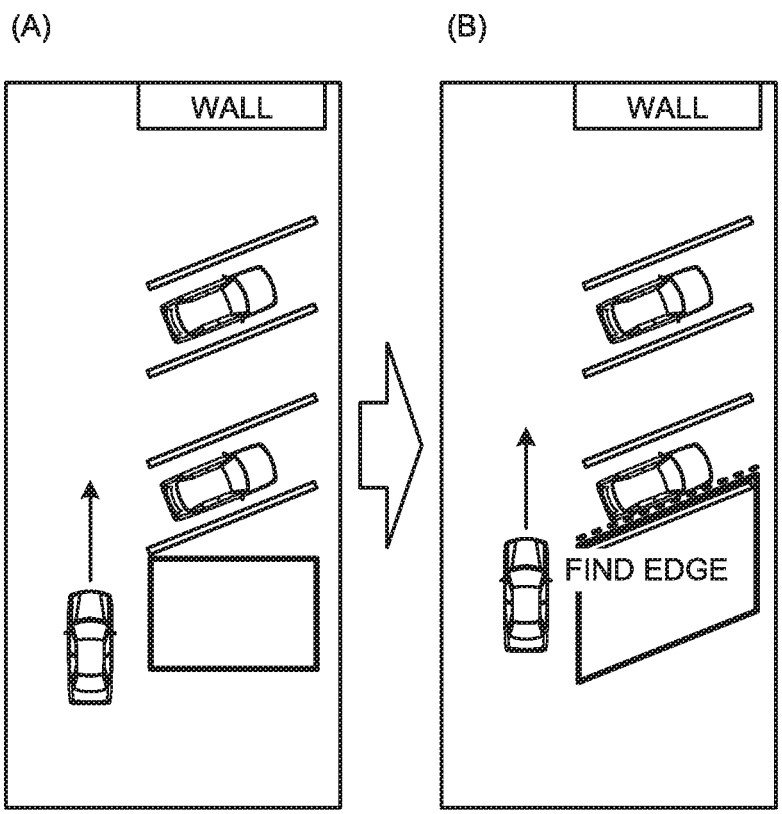
FIG. 22 is a diagram for explaining a state in which a vehicle equipped with the parking assist apparatus according to the third embodiment performs processing for detecting a vacant parking space while moving straight forward.

As illustrated in FIG. 22, it is assumed that the vehicle equipped with the parking assist apparatus 20 according to the present third embodiment performs the processing of detecting a vacant parking space described above while moving straight forward. In this case, the list of two-dimensional arrays for Hough transform is reset (initialized) for each frame while the occupancy grid map, the list of second straight lines, and the PSD list are not reset for each frame, and the processing is continued from the start to the end.

In FIG. 22(A), since the second straight line is not specified (that is, the edge of the object such as a vehicle is not found), the detection unit 204 performs PSD determination at the default angle θ. The default angle may be 0 degrees, for example. The vehicle then moves straight forward, and the second straight line is specified in FIG. 22(B), so that PSD determination is performed at the angle θ of the specified second straight line instead of the default angle θ.

As described above, in the third embodiment, Hough transform and PSD determination are performed while generating the occupancy grid map described above. Due to this, the processing speed can be improved while reducing the processing load of the processing related to detection of a vacant parking space.

Modification of Third Embodiment

In the processing of detecting the vacant parking space for each frame, when, for example, there are two second straight lines the difference between the angles of which is equal to or smaller than a reference value in the list of second straight lines that is referred to in the latest frame, any one of the second straight lines may be excluded from the target of PSD determination. Due to this, the processing speed can be further improved while further reducing the processing load of the processing for detecting a vacant parking space, and a similar detection result can be prevented from being redundantly output.

Figure 23:
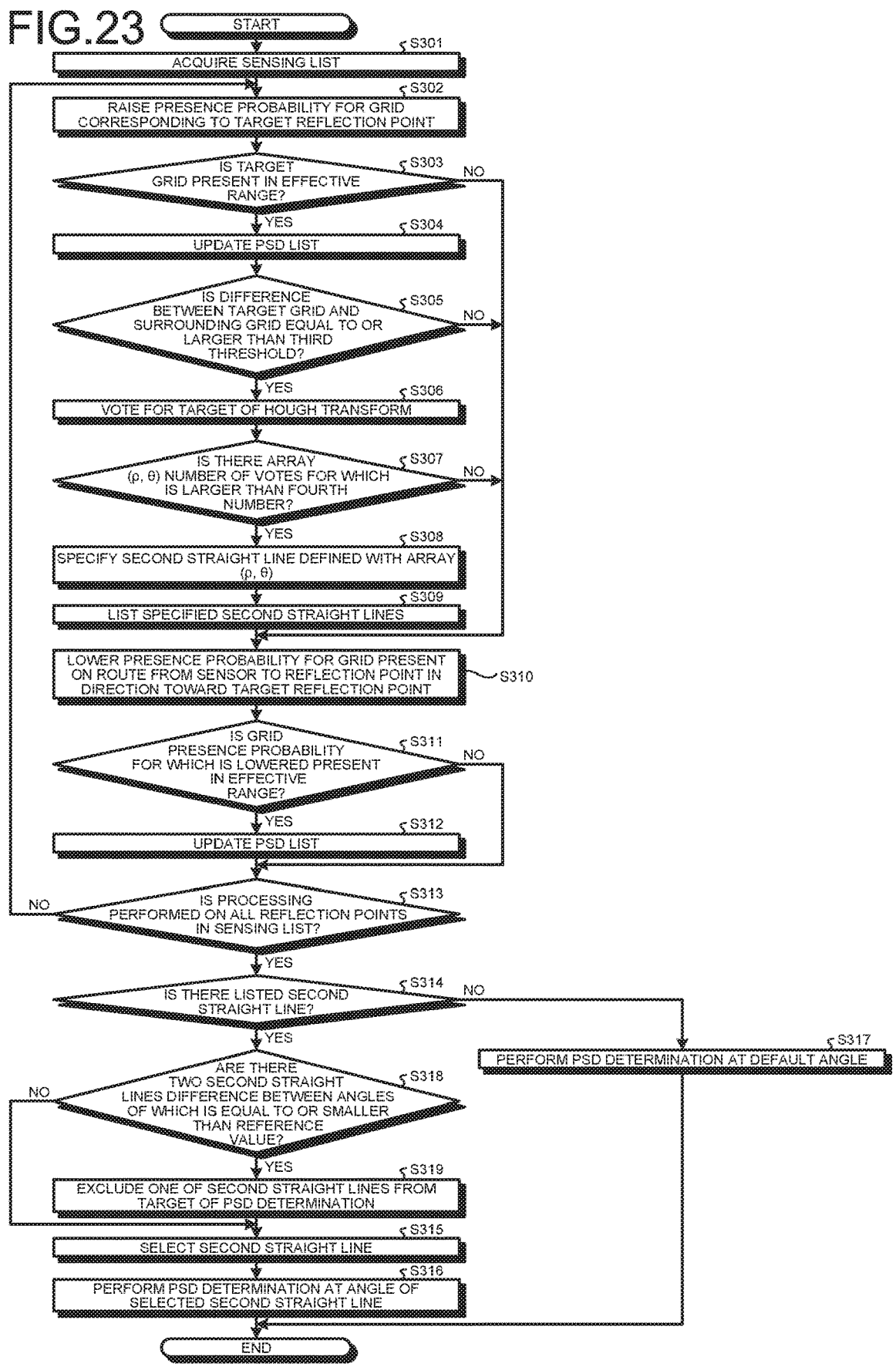
FIG. 23 is a flowchart illustrating an example of processing for detecting a vacant parking space performed by a parking assist apparatus according to a modification of the third embodiment.

FIG. 23 is a flowchart illustrating an example of the processing for detecting a vacant parking space performed by the parking assist apparatus 20 according to the present modification, and Step S318 and Step S319 are added between Step S314 and Step S315 in FIG. 21. When a result obtained at Step S314 described above is Yes (Yes at Step S314), the process proceeds to Step S318, and at Step S318, the detection unit 204 determines whether there are two second straight lines the difference between the angles of which is equal to or smaller than the reference value in the group of the listed second straight lines. When a result obtained at Step S318 is Yes (Yes at Step S318), the detection unit 204 excludes any one of the second straight lines from the target of PSD determination (Step S319). That is, the detection unit 204 excludes any one of the second straight lines from the target to be selected at Step S315 described above. A method of selecting the second straight line to be excluded from the target of PSD determination is optional, for example, the second straight line that has been listed later may be excluded from the target of PSD determination. The process then proceeds to Step S315 described above. When a result obtained at Step S318 is No (No at Step S318), the process directly proceeds to Step S315 described above.

As illustrated in FIG. 24, it is assumed that the vehicle equipped with the parking assist apparatus 20 according to the present modification performs the processing of detecting a vacant parking space according to the present modification while moving straight forward. In FIG. 24(A), the second straight line is not specified (the edge of the vehicle is not found), so that the detection unit 204 performs PSD determination at the default angle θ. The vehicle then moves straight forward, and the second straight line is specified in FIG. 24(B), so that PSD determination is performed at the angle θ of the specified second straight line instead of the default angle θ. The vehicle moves straight forward thereafter, and the second straight line is specified in FIG. 24(C) but a difference between the angle θ of the specified second straight line and the angle θ that has been subjected to PSD determination in FIG. 24(B) is equal to or smaller than the reference value. Thus, the angle θ of any one of the second straight lines is excluded from the target of PSD determination, and PSD determination is performed on only the angle θ of the other second straight line. The vehicle further moves straight forward, and the second straight line having the angle θ the difference of which from the angle θ determined at the position in FIG. 24(C) is larger than the reference value is newly specified in FIG. 24(D). Thus, PSD determination is performed at the angle θ that is determined at the position in FIG. 24(C) and already present in the list, and at the angle θ of the second straight line that is newly specified.

With the vacant parking space detection apparatus and the vacant parking space detection method according to the present disclosure, the processing load for detecting the vacant parking space can be reduced. The effects described herein are not necessarily limited, and any of the effects described herein may be exhibited.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The effects of the embodiments described herein are merely examples, and the present invention is not limited thereto. Other effects may be exhibited.

What is claimed is:

1. A vacant parking space detection apparatus comprising:
a memory; and
a hardware processor coupled to the memory, the hardware processor being configured to:
generate, for each of divided regions in a region around a vehicle, map information representing a presence probability of an object based on a detection result of a sensor for detecting an object present around the vehicle;
define on the map information a plurality of first straight lines, whose intercepts differ from each other, with one or more angles to a straight advancing direction of the vehicle; and
detect whether a vacant parking space is present at the angle based on a presence probability of an object assigned to the divided region belonging to each of the plurality of first straight lines.

2. The vacant parking space detection apparatus according to claim 1, wherein the hardware processor detects, for each of the one or more angles, whether a vacant parking space is present at the angle based on a number of the divided regions from which presence of an object is detected, the divided regions belonging to each of the plurality of first straight lines with the corresponding angle.

3. The vacant parking space detection apparatus according to claim 2, wherein the hardware processor detects that a vacant parking space is present at the angle when there are specific first straight lines between two first straight lines among the plurality of first straight lines corresponding to any of the one or more angles, each of the two first straight lines being a line to which divided regions whose number are equal to or larger than a first threshold belong and from which presence of an object has been detected, wherein
each of the specific first straight lines is a line to which divided regions whose number is smaller than the first threshold belong and from which presence of an object has been detected, and
a number of the specific first straight lines exceeds a first number.

4. The vacant parking space detection apparatus according to claim 1, wherein the hardware processor detects, for each of the one or more angles, whether a vacant parking space is present at the angle based on the number of the divided regions from which absence of an object is detected, the divided regions belonging to each of the plurality of first straight lines with the corresponding angle.

5. The vacant parking space detection apparatus according to claim 4, wherein the hardware processor detects that a vacant parking space is present at the angle when there are specific first straight lines between two first straight lines among the plurality of first straight lines corresponding to any of the one or more angles, each of the two first straight lines being a line to which divided regions whose number are smaller than a second threshold belong and from which absence of an object has been detected, wherein
each of the specific first straight lines is a line to which divided regions whose number is equal to or larger than the second threshold threshold belong and from which absence of an object has been detected, and
a number of the specific first straight lines exceeds a second number.

6. The vacant parking space detection apparatus according to claim 2, wherein the hardware processor is further configured to:
perform Hough transform on the divided region from which presence of an object is detected among the divided regions included in the map information and specify a second straight line to which the divided regions belong, whose number exceeds a third number and from which presence of an object is detected; and
detect whether a vacant parking space is present at an angle of the specified second straight line.

7. The vacant parking space detection apparatus according to claim 2, wherein hardware processor is further configured to:
perform Hough transform on a grid having a difference in presence probability of an object from a surrounding grid equal to or larger than a third threshold among grids included in the map information and specify a second straight line to which grids belong, the grids having a difference in presence probability of an object from a surrounding grid equal to or larger than the third threshold, a number of the grids exceeding a fourth number; and
detect whether a vacant parking space is present at an angle of the specified second straight line.

8. The vacant parking space detection apparatus according to claim 6, wherein the hardware processor specifies, after generating the map information, the second straight line by using the generated map information and performs processing of detecting whether a vacant parking space is present only at an angle of the specified second straight line.

9. The vacant parking space detection apparatus according to claim 6, wherein the hardware processor specify the second straight line by performing the Hough transform in parallel with the generation of the map information and performs processing of detecting whether a vacant parking space is present at an angle of the specified second straight line.

10. The vacant parking space detection apparatus according to claim 9, wherein,
every time when the sensor detects an object, presence of an object is detected from the divided region corresponding to the detected object, and absence of an object is detected from the divided region which is located between the sensor and the divided region corresponding to the detected object, and
every time when the sensor detects an object, the hardware processor
updates, for each of one or more angles to a straight advancing direction of a vehicle, the number of the divided regions from which presence of an object is detected on the first straight line including the divided region, from which presence of an object is newly detected, among the plurality of first straight lines with the corresponding angle, and updates a first list representing a relation between the plurality of first straight lines with the corresponding angle and the number of the divided regions from which presence of an object is detected, and
updates, for each of the one or more angles, the number of the divided regions from which absence of an object is detected on the first straight line including the divided region, from which absence of an object is newly detected, among the plurality of first straight lines with the corresponding angle, and updates a second list representing a relation between the plurality of first straight lines with the corresponding angle and the number of the divided regions from which absence of an object is detected.

11. The vacant parking space detection apparatus according to claim 10, wherein, when the second straight line is specified by performing the Hough transform, the hardware processor detects whether a vacant parking space is present at the angle by using the first list or the second list corresponding to an angle of the specified second straight line.

12. The vacant parking space detection apparatus according to claim 1, the hardware processor is further configured to set an effective range on the map information, in which the plurality of first straight lines are defined, the effective range representing a detection target for detecting whether a vacant parking space is present.

13. A vacant parking space detection method implemented by a computer, the method comprising:

generating, for each of divided regions in a region around a vehicle, map information representing a presence probability of an object based on a detection result of a sensor for detecting an object present around the vehicle;

defining on the map information a plurality of first straight lines, whose intercepts differ from each other, with one or more angles to a straight advancing direction of the vehicle; and detecting whether a vacant parking space is present at the angle based on a presence probability of an object assigned to the divided region belonging to each of the first straight lines.

* * * * *